United States Patent
Crooks

(10) Patent No.: US 11,247,399 B2
(45) Date of Patent: Feb. 15, 2022

(54) ADDITIVE MANUFACTURED PART WITH ENHANCED RIGIDITY AND METHOD OF MANUFACTURING THE SAME

(71) Applicant: A.M. Toolbox, LLC, Powell, OH (US)

(72) Inventor: Jared Crooks, Powell, OH (US)

(73) Assignee: A.M. Toolbox, LLC, Powell, OH (US)

(*) Notice: Subject to any disclaimer, the term of this patent is extended or adjusted under 35 U.S.C. 154(b) by 0 days.

(21) Appl. No.: 17/251,887

(22) PCT Filed: May 6, 2020

(86) PCT No.: PCT/US2020/031589
§ 371 (c)(1),
(2) Date: Dec. 14, 2020

(87) PCT Pub. No.: WO2020/227357
PCT Pub. Date: Nov. 12, 2020

(65) Prior Publication Data
US 2021/0245437 A1      Aug. 12, 2021

Related U.S. Application Data

(60) Provisional application No. 62/900,830, filed on Sep. 16, 2019, provisional application No. 62/844,142, filed on May 7, 2019.

(51) Int. Cl.
*B29C 64/165* (2017.01)
*B29C 64/30* (2017.01)
(Continued)

(52) U.S. Cl.
CPC .......... *B29C 64/30* (2017.08); *B29C 64/165* (2017.08); *B33Y 10/00* (2014.12); *B33Y 40/20* (2020.01); *B29K 2063/00* (2013.01)

(58) Field of Classification Search
None
See application file for complete search history.

(56) References Cited

U.S. PATENT DOCUMENTS 8,137,607 B2   3/2012   Kloeb et al.
10,773,456 B2   9/2020   Tomko et al.
(Continued)

FOREIGN PATENT DOCUMENTS

WO   WO-2017019899 A1 *   2/2017   ............. C04B 26/06
WO   2018/057738 A1   3/2018

OTHER PUBLICATIONS

Snelling, et al. "Mechanical and Material Properties of Castings Produced via 3D Printed Molds." Additive Manufacturing 27 (May 1, 2019): 199-207. Entire Document.
(Continued)

*Primary Examiner* — Monica A Huson
*Assistant Examiner* — Kelsey C Grace
(74) *Attorney, Agent, or Firm* — Kern Kendrick, LLC; Thomas Y. Kendrick

(57) ABSTRACT

An additive manufactured part is formed as a solid body of material including additive manufacturing powder, binder material supporting the powder in the shape of the solid body, and strengthening resin infused within the solid body. The additive manufacturing powder can be sand. The infused resin can be a two-part resin wherein an inert gas is added to the mixture of the two parts of the two-part resin during mixing. The infused resin can be infused inwardly from the peripheral surface of the solid body and can penetrate partially or fully through the thickness of the solid body.

5 Claims, 28 Drawing Sheets

(51) Int. Cl.
   *B33Y 10/00* (2015.01)
   *B33Y 40/20* (2020.01)
   *B29K 63/00* (2006.01)

(56) References Cited

U.S. PATENT DOCUMENTS

| | | |
|---|---|---|
| 10,974,451 B2 | 4/2021 | Conner et al. |
| 2005/0123738 A1 | 6/2005 | De Winter et al. |
| 2006/0188726 A1 | 8/2006 | Muenz et al. |
| 2009/0176058 A1 | 7/2009 | Petersen |
| 2012/0123035 A1 | 5/2012 | Sarrazin et al. |
| 2018/0215666 A1 | 8/2018 | Qiao et al. |

OTHER PUBLICATIONS

International Search Report and Written Opinion in related PCT/US2020/031589 dated Sep. 16, 2020.

* cited by examiner

ADDITIVE MANUFACTURED PART WITH ENHANCED RIGIDITY AND METHOD OF MANUFACTURING THE SAME

CROSS-REFERENCE TO RELATED APPLICATIONS

This application claims priority to U.S. Provisional Patent Application No. 62/844,142, filed May 7, 2019, and U.S. Provisional Patent Application No. 62/900,830, filed Sep. 16, 2019, each of which is incorporated by reference herein in its entirety.

BACKGROUND

An additive manufacturing process can form a part by depositing powder in successive layers that together define the shape of the finished part. A binder material is deposited with the powder to support and retain the powder in the desired shape. In some instances, sand is used as the powder.

SUMMARY

An additive manufactured part comprises a solid body of material including additive manufacturing powder, binder material supporting the powder in the shape of the solid body, and strengthening resin infused within the solid body.

The additive manufacturing powder can be sand. The infused resin can be a two-part resin including an epoxy resin and an epoxy curing agent. The infused resin can be infused inwardly from the peripheral surface of the solid body and can penetrate partially or fully through the thickness of the solid body.

In given examples, the solid body is formed in the configuration of a tool. In one example, the tool is an axe head. In another example, the tool is a vacuum mold tool having a forming surface and air flow channels communicating with the forming surface. The mold tool can be supported on rails for sliding across a base in a vacuum mold assembly. Such a mold tool can be one of multiple tools that slide into adjoining positions in which they define a combined forming surface. The mold tool can also have trim lines defined by cuts in the forming surface.

A method of forming the part first forms a porous body of additive manufacturing powder and binder material. Strengthening resin is then infused into the porous body and is cured within the porous body.

When used as a mold tool, the part is placed on a base having air flow channels communicating with the air flow channels in the mold tool. A sheet of vacuum molding material is placed over the forming surface of the mold tool. Vacuum pressure is applied in the air flow channels in the base and the mold tool to draw the sheet of molding material against the forming surface.

In one method, an inert gas is introduced into a two-part infusion resin and/or two-part tooling gel coat during mixing of the two parts together. In one aspect, the inert gas may be nitrogen gas or argon gas.

In one aspect, a method is provided, the method comprising: forming a porous body of additive manufacturing powder and binder material in an additive manufacturing process; infusing resin into the porous body, wherein the resin is a two-part resin including a resin and a hardener, and wherein an inert gas is applied to the two-part resin during mixture of the resin and the hardener; and curing the infused resin within the porous body.

In another aspect, a method is provided, the method comprising: placing a mold tool on a base having air flow channels, the mold tool having a forming surface and air flow channels communicating the forming surface with the air flow channels in the base; wherein the mold tool comprises additive manufacturing powder and a binder supporting the additive manufacturing powder as a solid body having the forming surface, and further comprising a resin infused within the solid body, wherein the resin is a two-part resin including a resin and a hardener, and wherein an inert gas is applied to the two-part resin during mixture of the resin and the hardener; placing a sheet of vacuum molding material over the forming surface; and applying vacuum pressure in the air flow channels in the base and the mold tool to draw the sheet of molding material against the forming surface.

In one aspect, an apparatus is provided, the apparatus comprising: a solid body of material having a shape, wherein the material includes additive manufacturing powder, binder material supporting the additive manufacturing powder in the shape of the solid body, and resin infused within the solid body, wherein the resin is a two-part resin including a resin and a hardener, and wherein an inert gas is applied to the two-part resin during mixture of the resin and the hardener.

In another aspect, an apparatus is provided, the apparatus comprising: a mold tool having a forming surface and air flow channels communicating with the forming surface; wherein the mold tool includes additive manufacturing powder, a binder supporting the additive manufacturing powder as a solid body having the forming surface, and resin infused within the solid body, wherein the resin is a two-part resin including a resin and a hardener, and wherein an inert gas is applied to the two-part resin during mixture of the resin and the hardener.

In one aspect, a mixing tool is provided, the mixing tool comprising: a housing having a hollow bore; a mixing shaft extending through the hollow bore, wherein the mixing shaft includes a mixing head at a distal end of the mixing shaft, and wherein the mixing shaft includes a proximate end engaged by a rotation-inducing device; and an air line having a nozzle at a distal end, wherein the air line contains a flow of an inert gas directed through the nozzle, and wherein the nozzle is oriented near the mixing head.

In another aspect, an apparatus is provided, the apparatus comprising: a mold tool having a forming surface and air flow channels communicating with the forming surface; wherein the mold tool includes additive manufacturing powder, a binder supporting the additive manufacturing powder as a solid body having the forming surface, and resin infused within the solid body, wherein the resin is a two-part resin including a resin and a hardener, and wherein an inert gas is applied to the two-part resin during mixture of the resin and the hardener; and wherein the mold tool includes an ejector element extending through the forming surface.

DETAILED DESCRIPTION

Figure 1:
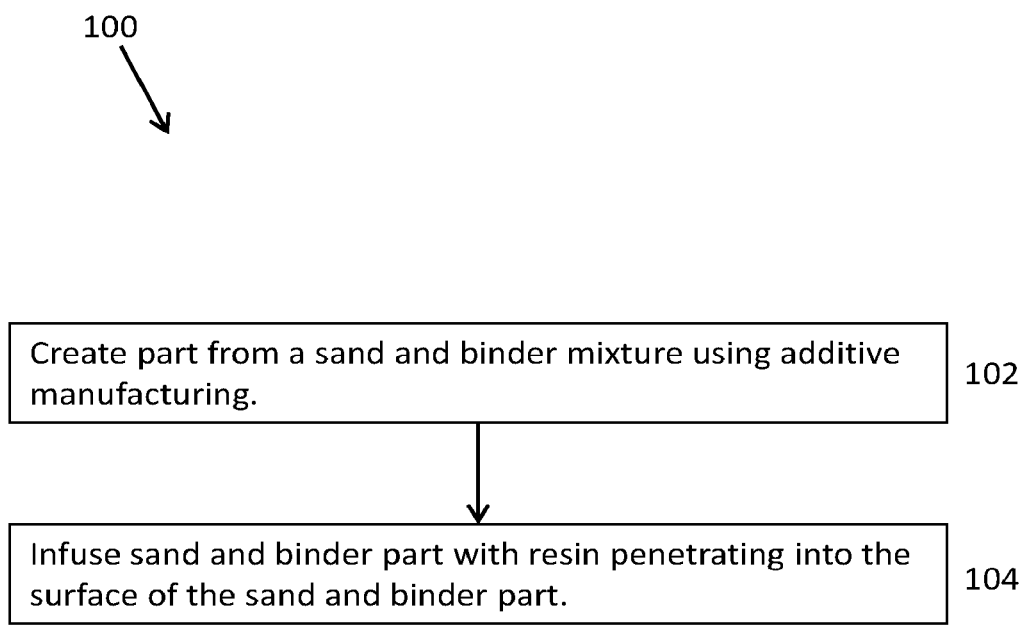
FIG. 1 is a flow chart of steps taken in a method of forming an additive manufactured part.

The apparatus illustrated in the drawings includes structures that are examples of the elements recited in the apparatus claims and can be employed to perform the steps recited in the method claims. The illustrated apparatus thus includes examples of how a person of ordinary skill in the art can make and use the claimed invention. These examples are described to meet the written description and enablement requirements of the patent statute without imposing limitations that are not recited in the claims. One or more elements of one aspect may be used in combination with, or as a substitute for, one or more elements of another aspect as needed for any particular implementation of the claimed invention.

Figure 2:
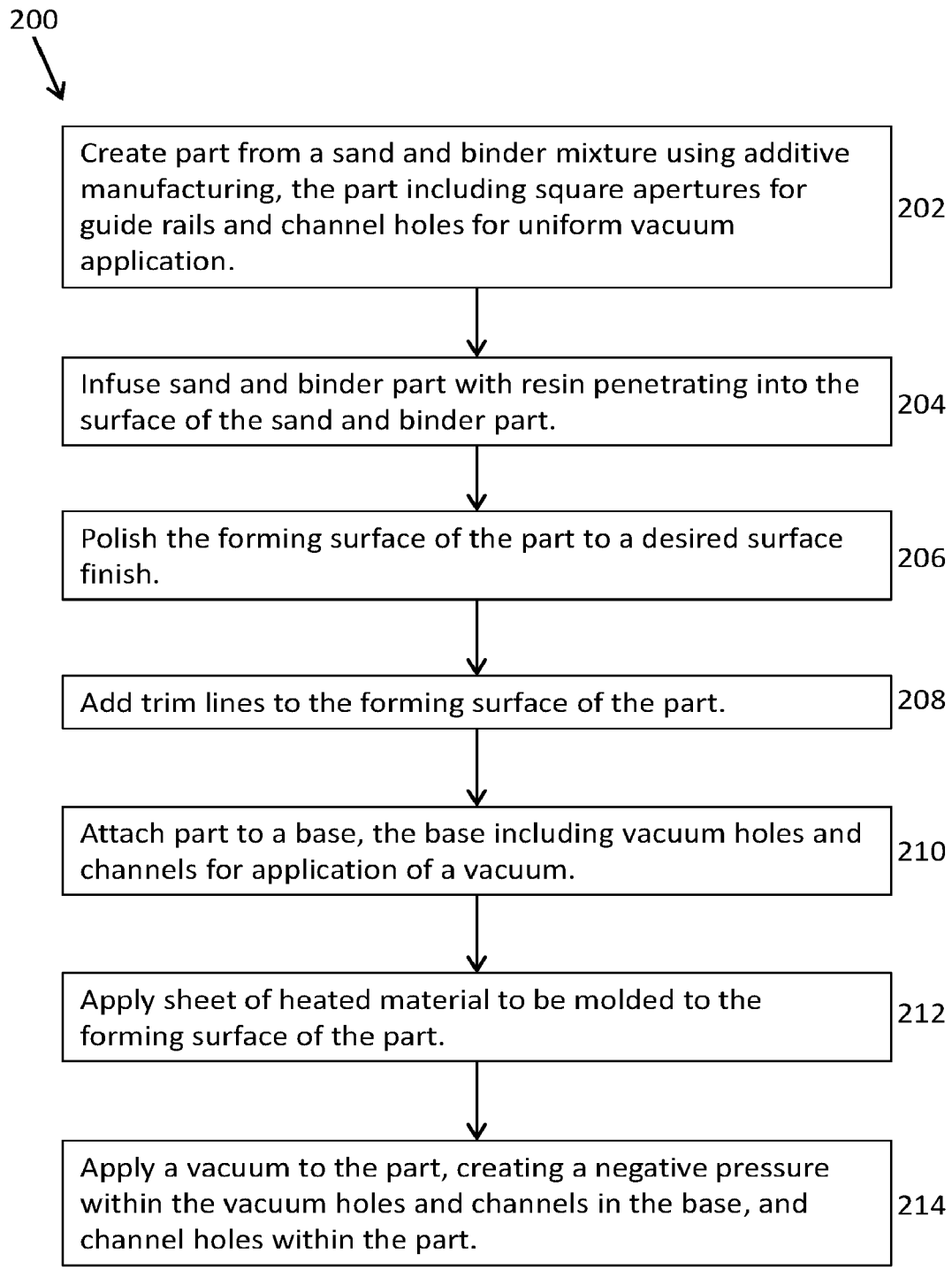
FIG. 2 also is a flow chart of steps taken in a method of forming an additive manufactured part.
Figure 3:
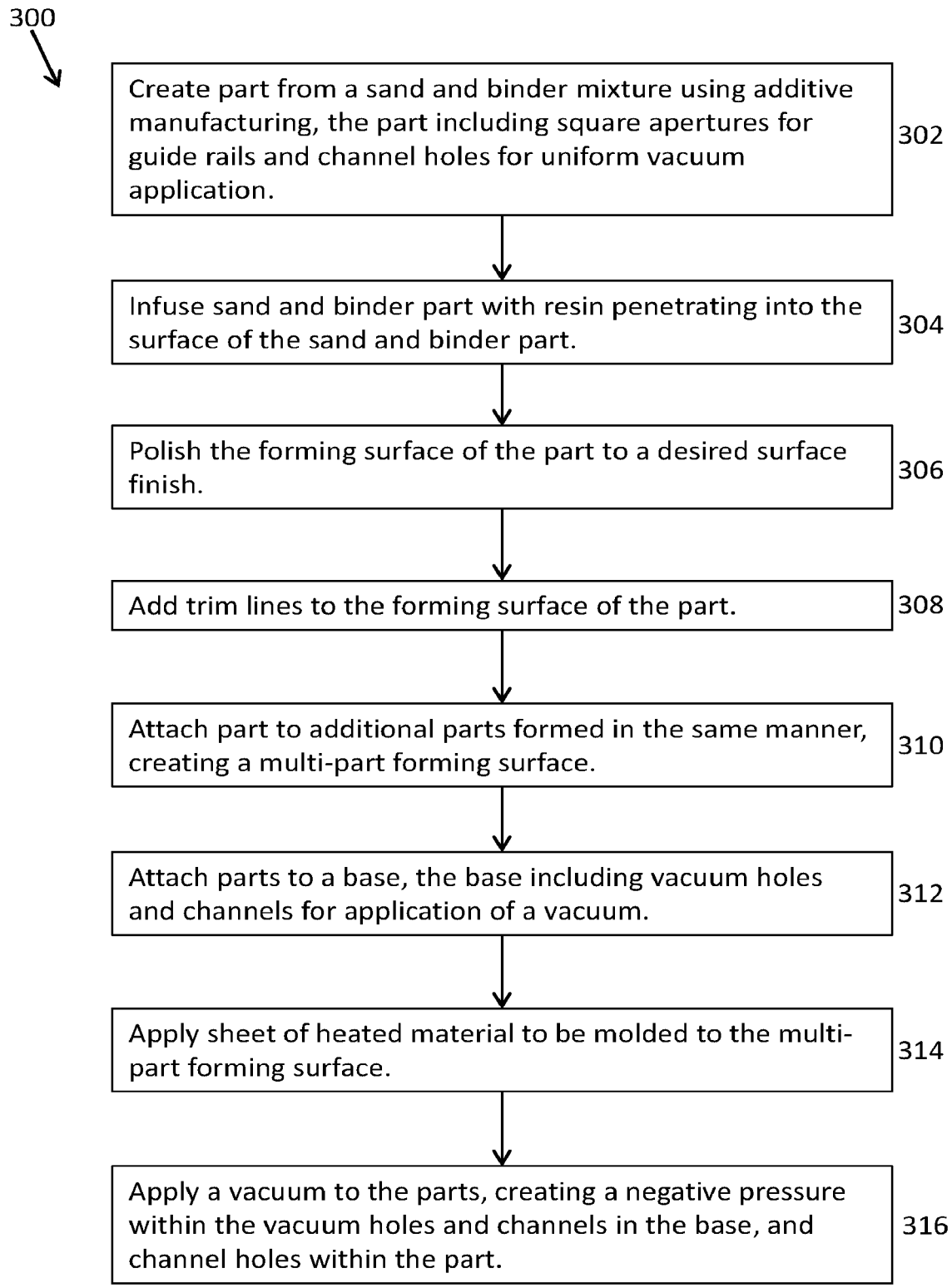
FIG. 3 is another flow chart of steps taken in a method of forming an additive manufactured part.

As shown in FIGS. 1, 2, and 3, methods of forming and using an additive manufactured part can be performed in the steps summarized.

Method 100 may include the following steps: create part from a sand and binder mixture using additive manufacturing (102) and infuse sand and binder part with resin penetrating into the surface of the sand and binder part (104).

Method 200 may include the following steps: create part from a sand and binder mixture using additive manufacturing, the part including square apertures for guide rails and channel holes for uniform vacuum application (202); infuse sand and binder part with resin penetrating into the surface of the sand and binder part (204); polish the forming surface of the part to a desired surface finish (206); add trim lines to the forming surface of the part (208); attach part to a base, the base including vacuum holes and channels for application of a vacuum (210); apply sheet of heated material to be molded to the forming surface of the part (212); and apply a vacuum to the part, creating a negative pressure within the vacuum holes and channels in the base, and channel holes within the part (214).

Method 300 may include the following steps: create part from a sand and binder mixture using additive manufacturing, the part including square apertures for guide rails and channel holes for uniform vacuum application (302); infuse sand and binder part with resin penetrating into the surface of the sand and binder part (304); polish the forming surface of the part to a desired surface finish (306); add trim lines to the forming surface of the part (308); attach part to additional parts formed in the same manner, creating a multi-part forming surface (310); attach parts to a base, the base including vacuum holes and channels for application of a vacuum (312); apply sheet of heated material to be molded to the multi-part forming surface (314); and apply a vacuum to the parts, creating a negative pressure within the vacuum holes and channels in the base, and channel holes within the part (316).

Figure 4A:
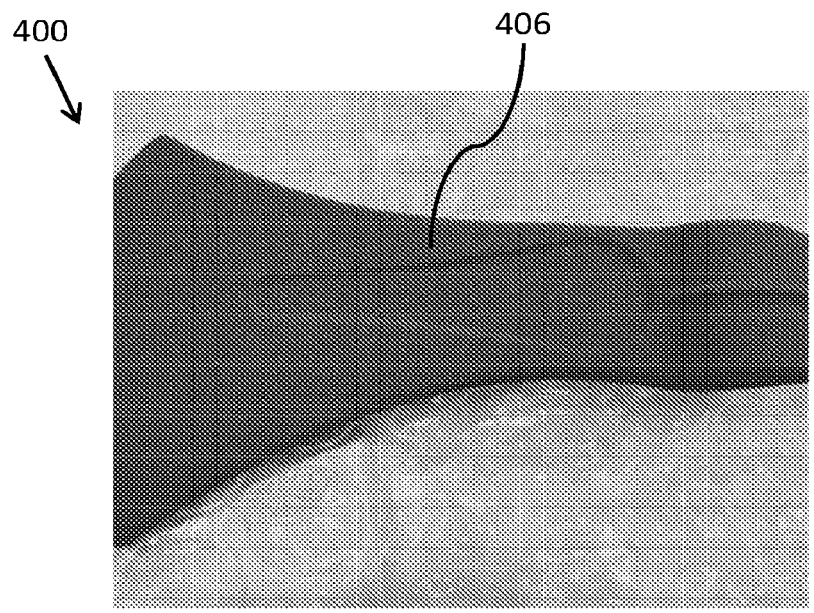
FIG. 4A is a view of a partially formed additive manufactured part.
Figure 4B:
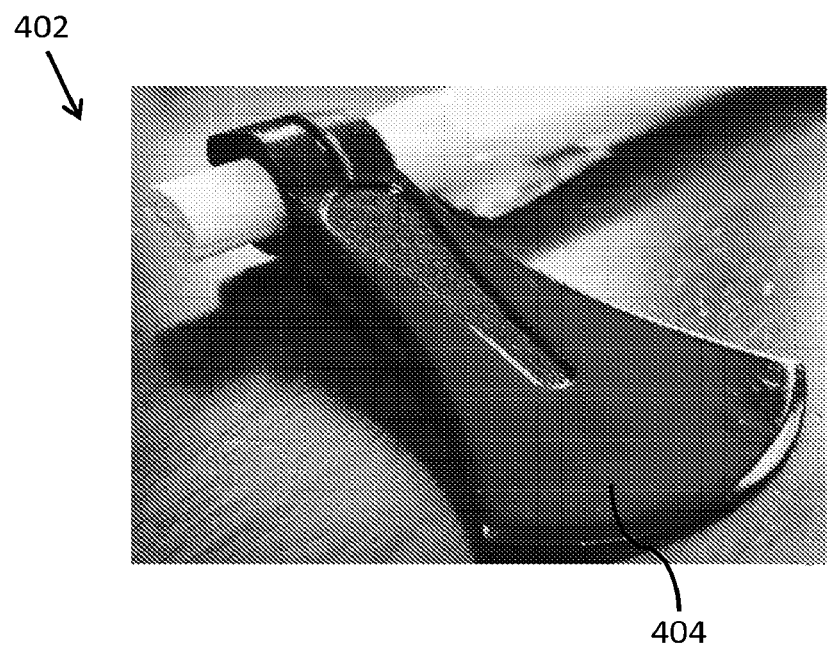
FIG. 4B is a view of an additive manufactured part.

FIG. 4 is a partial view of a porous body of material 400. The porous body 400 has the shape of a tool, specifically the axe head 402 of FIG. 4B. The material of which the body 400 is formed includes additive manufacturing powder, and further includes binder material that is cured to support the powder in the shape of the body 400. The additive manufacturing powder in this example is sand. The binder material can be any suitable binder material known in the art.

In the condition shown in FIG. 4A, the body 400 includes only the sand and the cured binder that holds the sand in the shape of the axe head. The body 400 may thus be referred to as "green." However, in the condition of FIG. 4B, a resin 404 has been infused into the porous structure of the body 400. The infused resin 404 overlies the peripheral surface 406 (FIG. 4A) of the body 400 and penetrates inwardly from the peripheral surface 406. The resin 404 can be applied manually at the peripheral surface 406, and the penetration may be accomplished by wicking action in the porous structure of the body 400. When cured, the infused resin 404 imparts additional rigidity so that the body 400 as a whole can serve as an axe head 402, whereas a green sand/binder material alone would not have the rigidity needed for an axe head. A resin material including both an epoxy resin and an epoxy curing agent may be preferable.

Figure 5A:
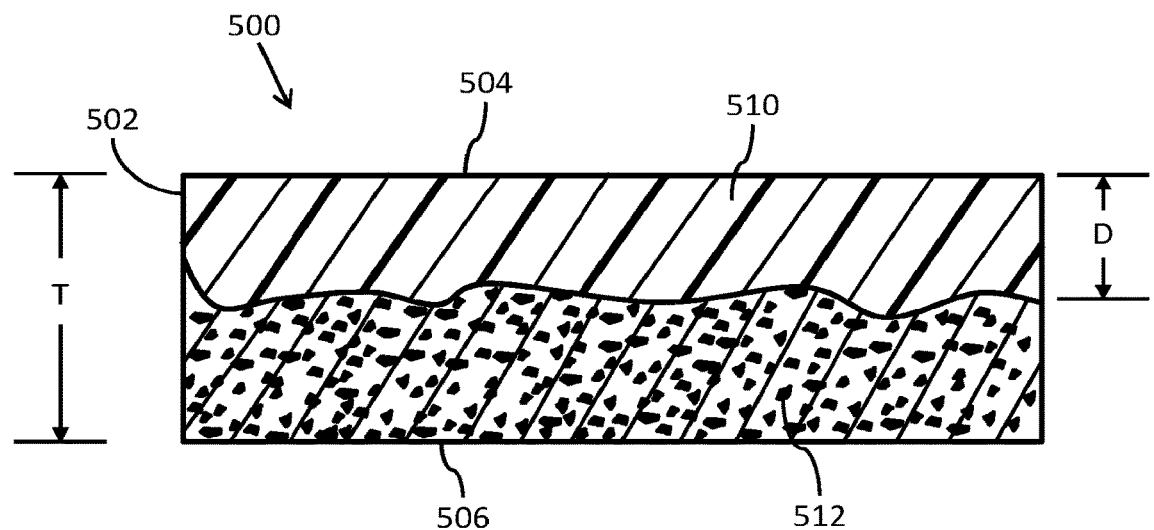
FIG. 5A is a partial sectional view of an additive manufactured part.
Figure 5B:
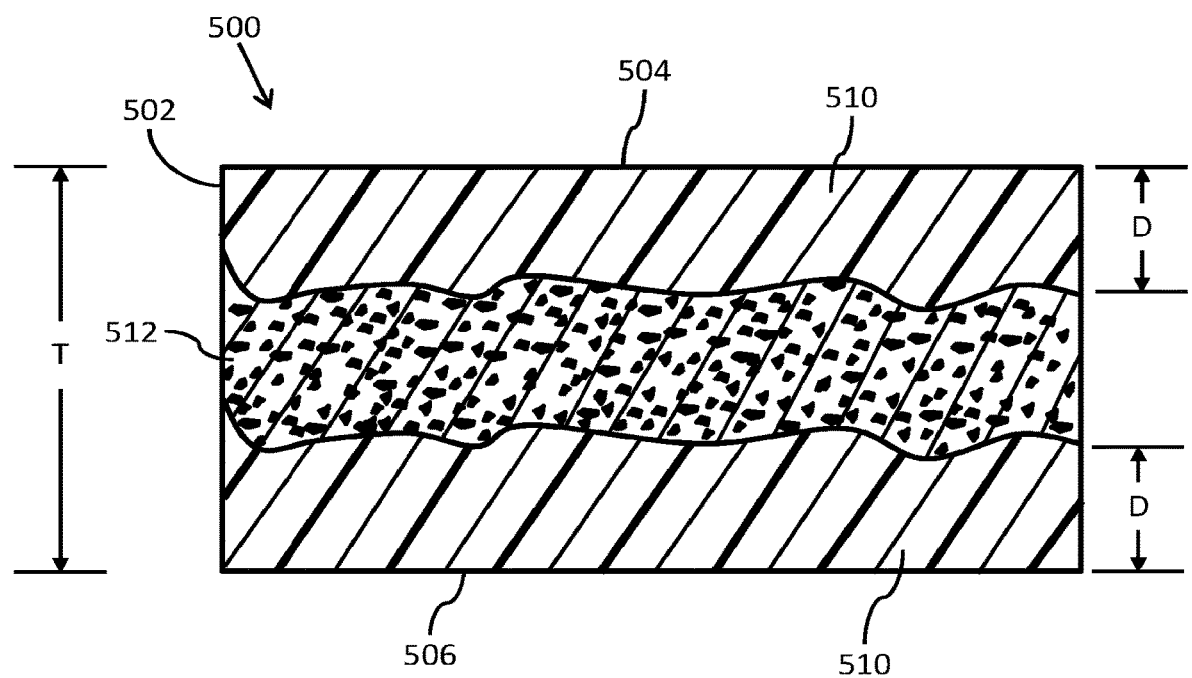
FIG. 5B is a view similar to FIG. 5A showing an alternative structure of the part.
Figure 6A:
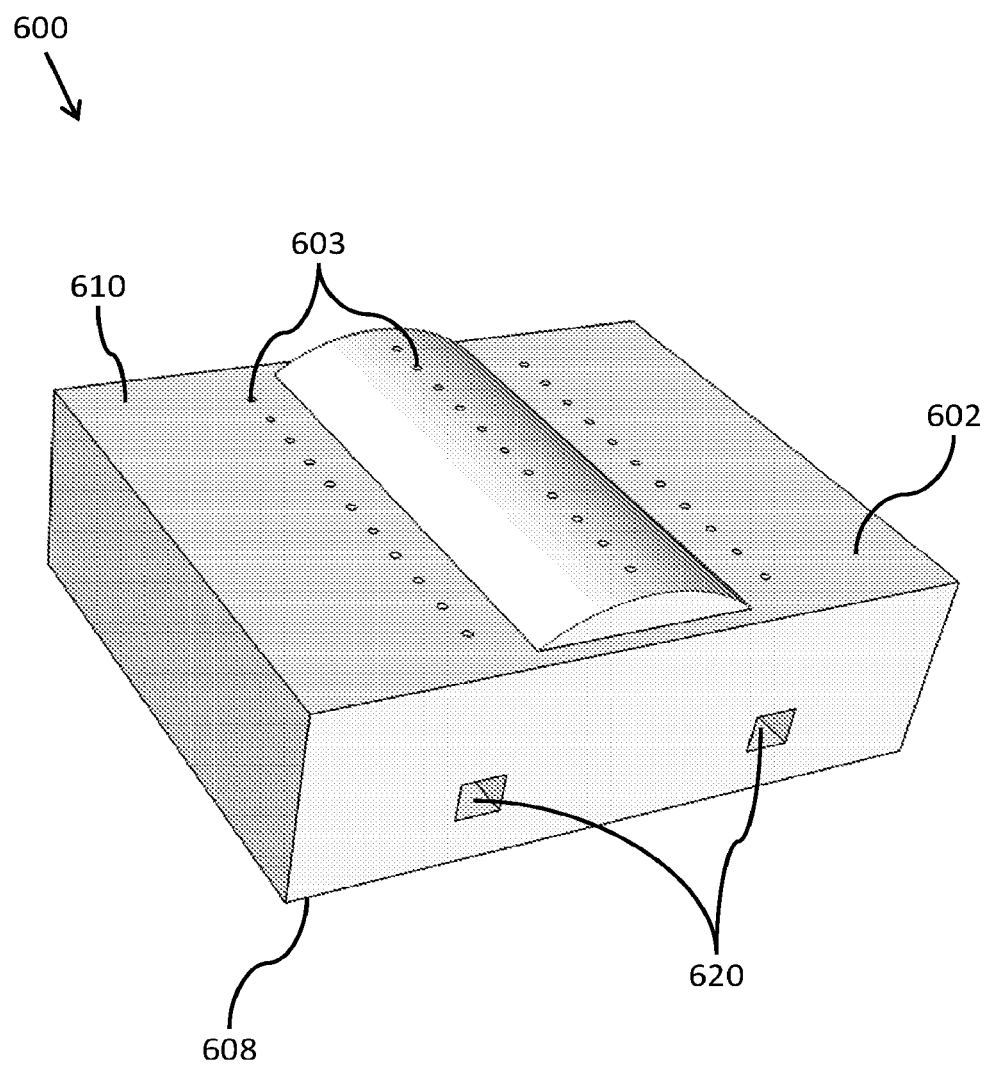
FIG. 6A is a view of an additive manufactured part configured as a vacuum mold tool.
Figure 6B:
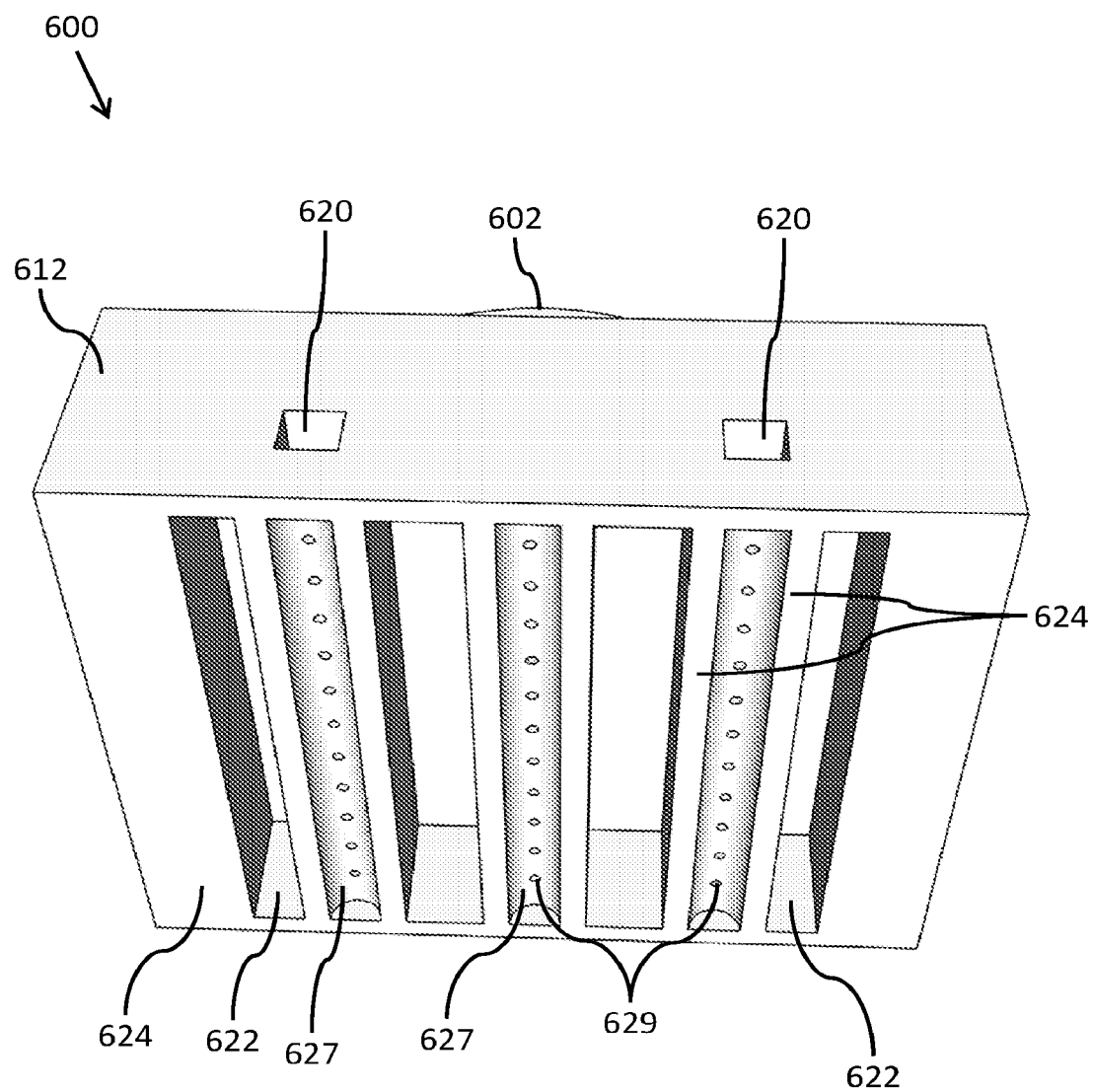
FIG. 6B is a view of an additive manufactured part configured as a vacuum mold tool.
Figure 6C:
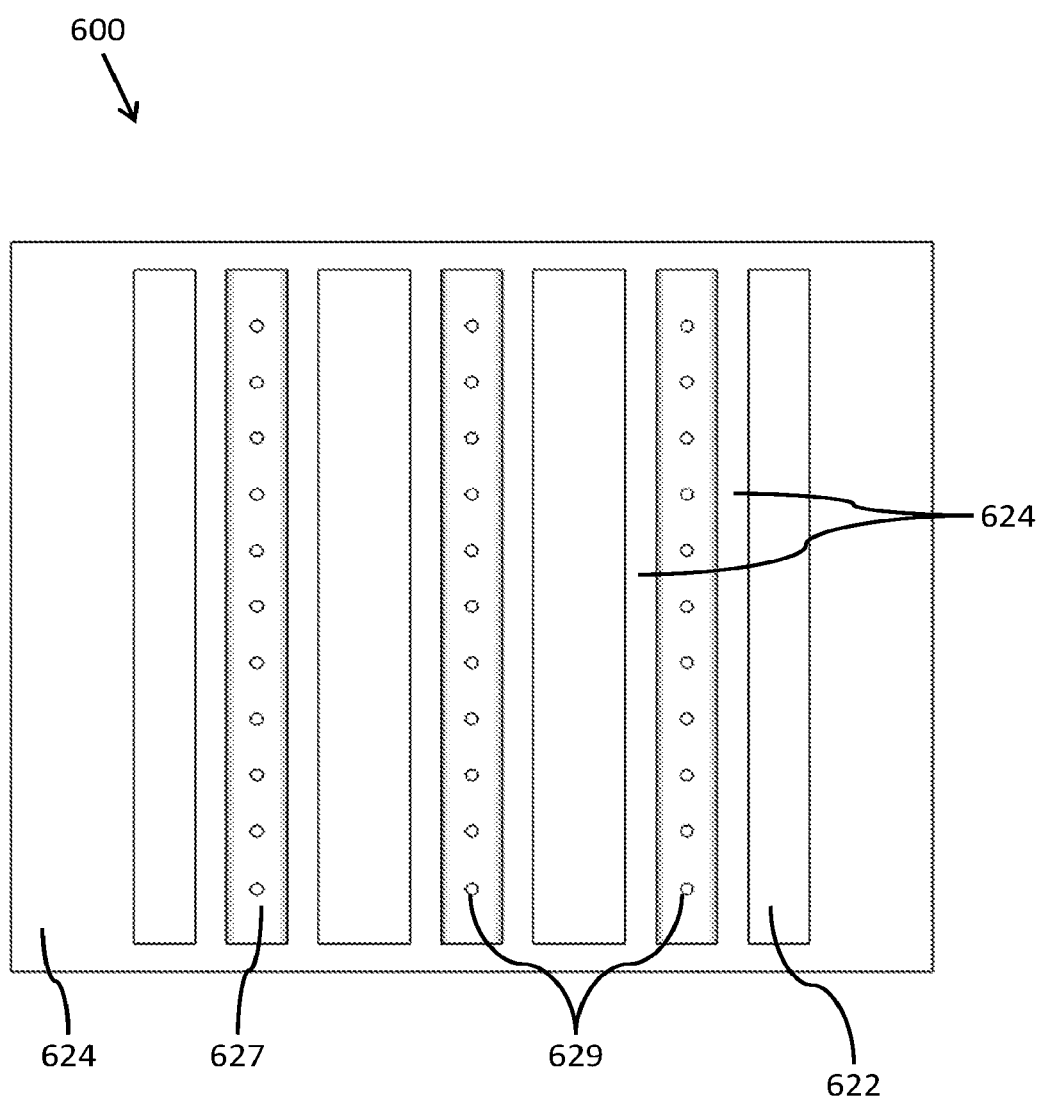
FIG. 6C is a view of an additive manufactured part configured as a vacuum mold tool.
Figure 6D:
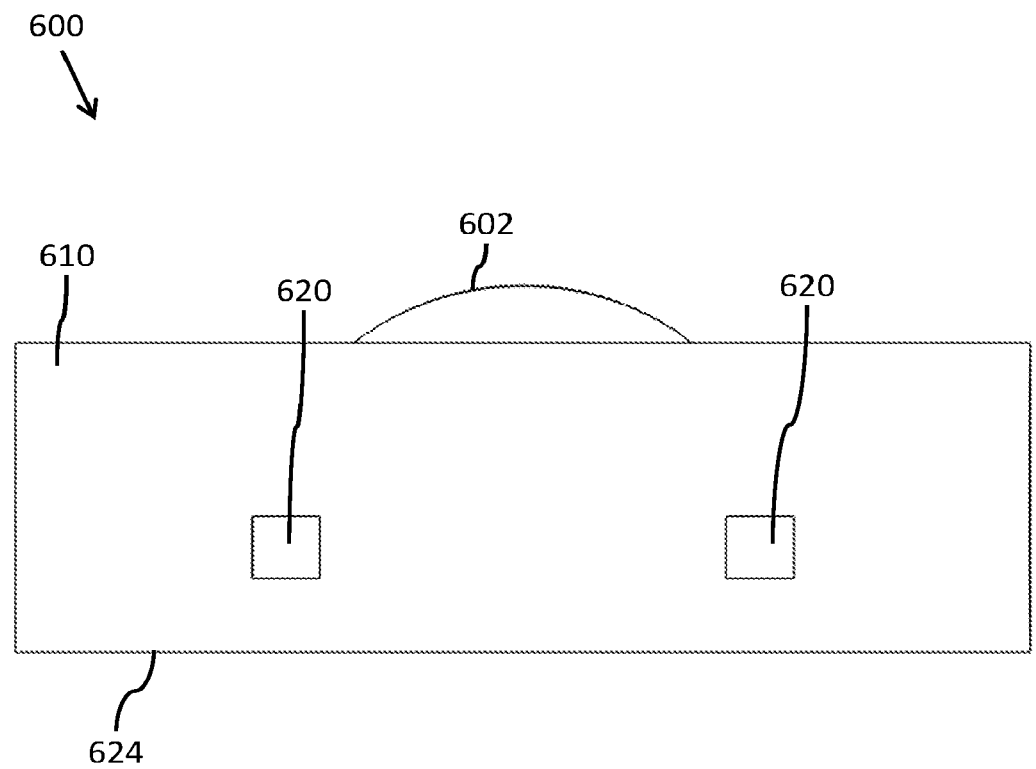
FIG. 6D is a view of an additive manufactured part configured as a vacuum mold tool.

Another example of an additive manufactured part 500 is shown partially in the cross-sectional view of FIG. 5A. The illustrated section 502 of the part 500 has a thickness T between opposed peripheral surface portions 504 and 506. A resin 510 is infused inwardly from one of the opposed surface portions 504, and penetrates the green sand/binder material 512 to a depth D that is less that the thickness T. The infused resin 510 could alternatively penetrate through the entire thickness T or, as shown in the example of FIG. 5B, could be infused inwardly from both of the opposed surface portions 504 and 506. The depth of penetration can be selected to provide a corresponding degree of enhanced rigidity as needed for the intended use of the finished part 500.

The example of FIGS. 6A-6D is an additive manufactured part configured for use as vacuum mold tool. The tool 600 has a contoured forming surface 602 with vacuum ports 603. The vacuum ports 603 communicate with internal air flow passages leading to a source of vacuum pressure. The forming surface 602 is contoured to impart a corresponding contour to a sheet of vacuum molding material that is drawn against the forming surface 602 by the vacuum pressure at the ports 603.

The material of which the tool 600 is formed includes additive manufacturing powder, which in this example is sand, and further includes binder material that is cured to support the powder in the shape of a vacuum mold tool. Additionally, resin 610 is infused inwardly from the peripheral surface of the sand/binder material. The infused resin 610 provides the body of sand/binder material with the rigidity needed for use of the tool 600 as a vacuum mold tool. As described above, the infused resin 610 can include an epoxy resin and an epoxy curing agent. Tool 600 may include a lower portion 608 opposite forming surface 602. Lower portion 608 may interact with and/or engage a base. Side portions 612 may be oriented between forming surface 602 and lower portion 608. At least a portion of side portions 612 may or may not be part of the forming surface depending upon the design of tool 600 and whether a vacuum molding material is intended to contact side portions 612.

As further shown in FIGS. 6A-6D, the tool 600 has passages 620 for receiving rails that support the part 600 on a base in a vacuum molding assembly. Such a base has air flow passages and ports for communicating the vacuum source with the ports 603 and passages in the tool 600. Also shown are cut-outs 622 at a bottom side of the tool 600 opposite the forming surface 602. The cut-outs 622 reduce the material and hence the weight of the tool 600, and ribs 624 are provided for strength. Air flow channels 627 with ports 629 are arranged to communicate with the air flow features of the vacuum molding base; ports 629 may be in fluid communication with ports 603.

Figure 7A:
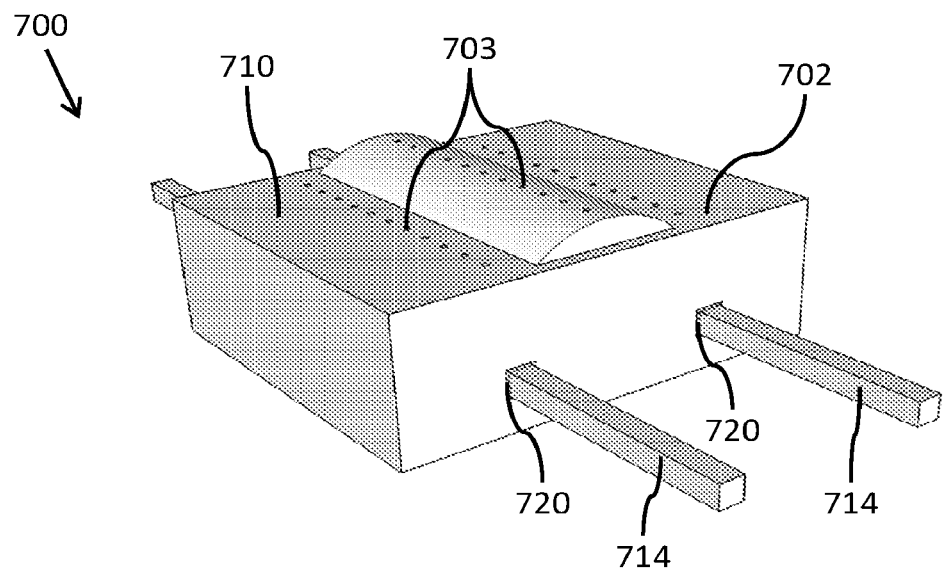
FIG. 7A is a view of an additive manufactured part with rails for use of the part as a vacuum mold tool.
Figure 7B:
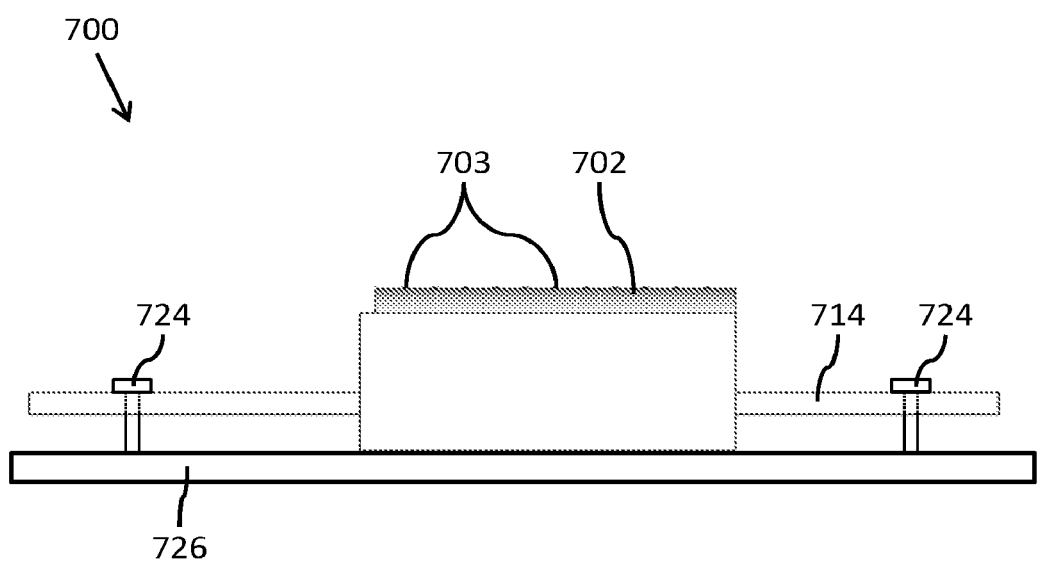
FIG. 7B is a view showing the apparatus of FIG. 7A on a base in a vacuum mold assembly.

The example of FIGS. 7A and 7B includes a vacuum mold tool 700 that is substantially the same as the tool 600 of FIGS. 6A-6D. The tool 700 thus has a contoured forming surface 702 with vacuum ports 703. The vacuum ports 703 communicate with internal air flow passages leading to a source of vacuum pressure. The forming surface 702 is contoured to impart a corresponding contour to a sheet of vacuum molding material that is drawn against the forming surface 702 by the vacuum pressure at the ports 703. The tool 700 likewise has a bottom side with cut-outs, air flow channels, and ports as described with reference to the tool 600.

The material of which the tool 700 is formed includes additive manufacturing powder, which in this example is sand, and further includes binder material that is cured to support the powder in the shape of a vacuum mold tool. Resin 710 is infused inwardly from the peripheral surface of the sand/binder material. The infused resin 710 provides the body of sand/binder material with the rigidity needed for the tool 700 to serve as a vacuum mold tool. The infused resin 710 can include an epoxy resin and an epoxy curing agent.

Also shown in FIGS. 7A and 7B are rails 714 reaching through passages 720 in the tool 700. The rails 714 support the tool 700 on a vacuum forming base 726 (FIG. 7B). The base 726, which can be formed of wood, or any material capable of being machined and supporting the weight of tool 700, is configured with air flow features as described above. Fasteners 724 support the rails 714 on the base 726 such that the tool 700 can slide along the rails 714 for alignment with the air flow features in the base 726. The fasteners 714 also bear a substantial portion of the weight of the tool 700.

Figure 8:
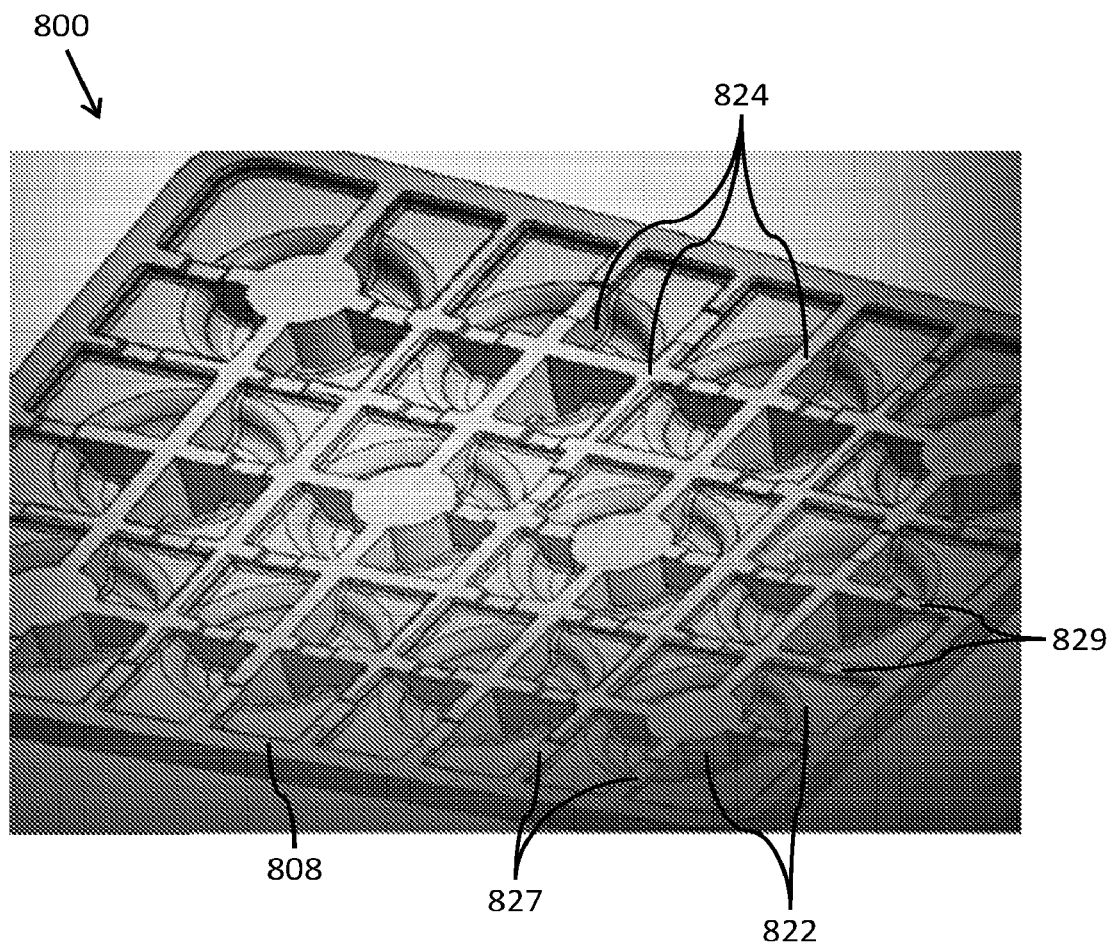
FIG. 8 is a bottom view of an additive manufactured part configured as a vacuum mold tool.

FIG. 8 is a bottom view of a tool 800 that differs from the tool 700 by having a differently configured array of cut-outs 822, ribs 824, and air flow channels 827 at the bottom side 808. The air flow channels 827 include notches 829 in the ribs 824.

Figure 9:
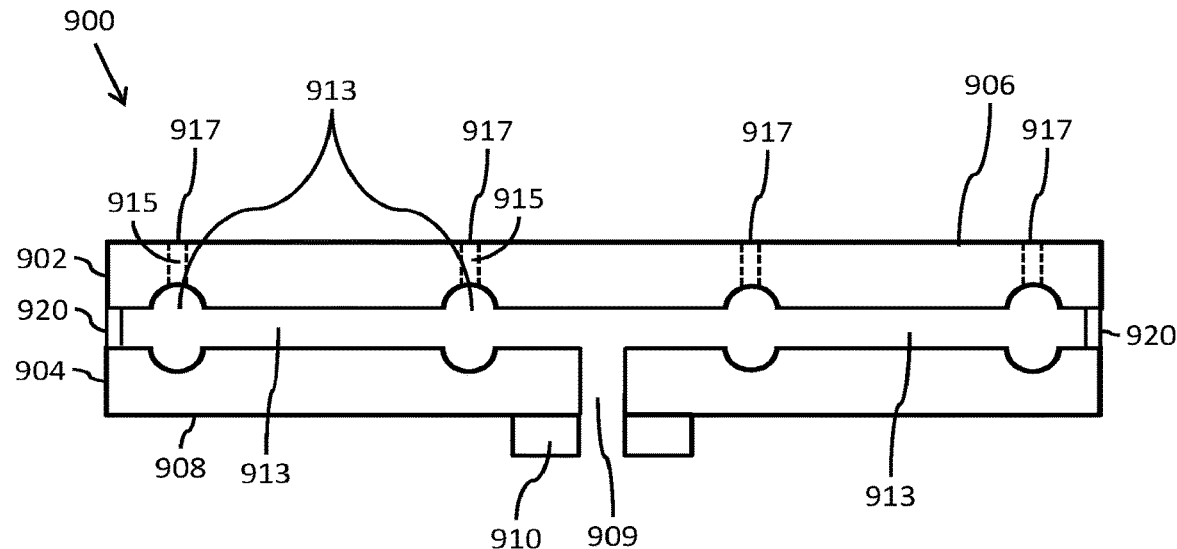
FIG. 9 is a schematic side sectional view of a base in a vacuum mold assembly.
Figure 10:
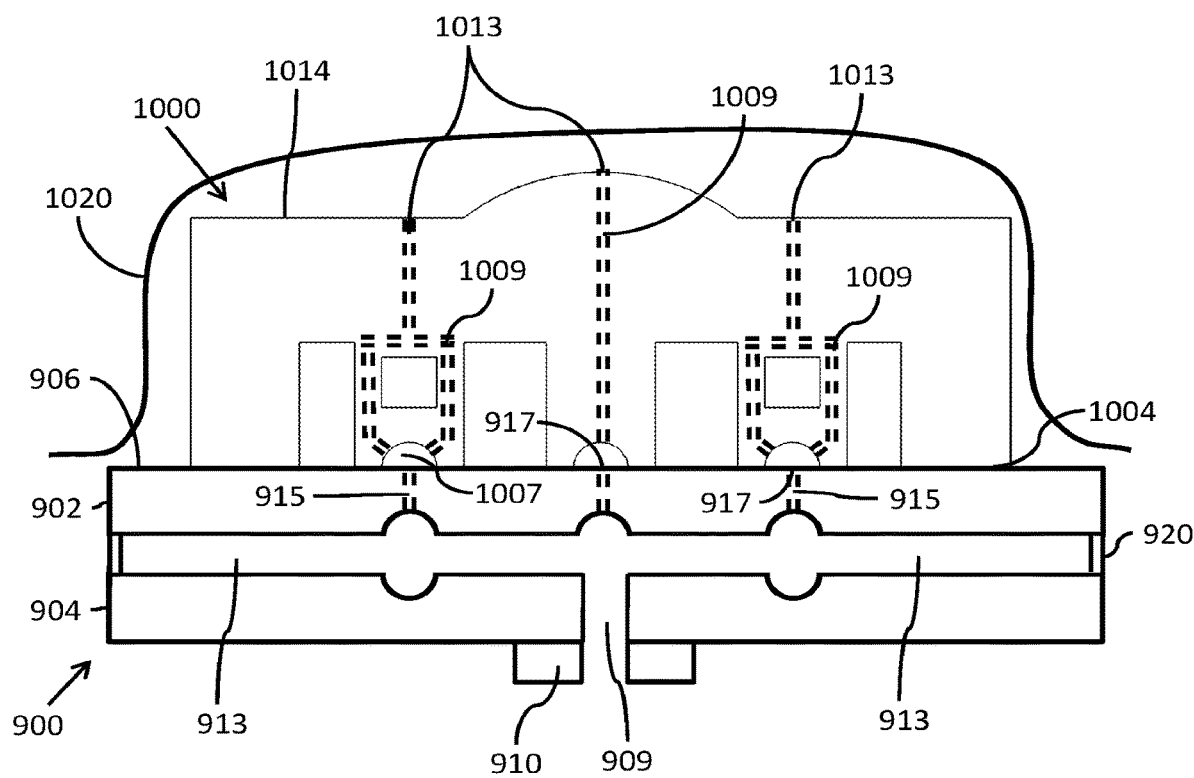
FIG. 10 is a schematic side sectional view showing a vacuum mold tool on the base of FIG. 9.

Another example of a vacuum forming base 900 is shown in FIG. 9. This base 900 includes upper and lower panels 902 and 904, each of which can be formed of wood or any material capable of being machined and supporting the weight of tool 1000 (FIG. 10). The upper panel 902 has an upper side surface 906 with a planar contour for supporting an additive manufactured vacuum mold tool as described above. The lower panel 904 has a lower side surface 908 with a central port 909. A fitting 910 is provided to connect the port 909 with a vacuum air line. An array of passages 913 between the panels 902 and 904 communicate the port 909 with additional passages 915 that reach through the upper panel 902 to vacuum ports 917 at the upper side surface 906. A peripheral seal 920 is provided between the panels 902 and 904.

As shown in FIG. 10, another example of an additive manufactured vacuum mold tool 1000 is shown in an operative position on the base 900 of FIG. 9. Like the mold tools described above, this tool 1000 is formed of material including additive manufacturing powder, preferably sand, and binder material that is cured to support the powder in the shape of a vacuum mold tool. Resin is infused inwardly from the peripheral surface of the body of sand/binder material. The infused resin provides the body of sand/binder material with the rigidity needed for the tool 1000 to be used as a vacuum mold tool. The infused resin can include an epoxy resin and an epoxy curing agent.

The tool 1000 has a bottom side 1004 with air flow channels 1007 positioned over the vacuum ports 917 at the upper side surface 906 of the base 900. Internal air flow passages 1009 in the tool 1000 communicate the channels 1007 with vacuum ports 1013 at the forming surface 1014 of the tool 1000. In use, a heated sheet 1020 of vacuum forming material is placed over the tool 1000 as shown in FIG. 10. Vacuum pressure is then applied through the interconnected channels 913, 1007, 1009 and ports 909, 917, 1013 to draw the sheet 1020 against the forming surface 1014, and thereby to form the sheet 1020 with a contour corresponding to the contour of the forming surface 1014.

Figure 11:
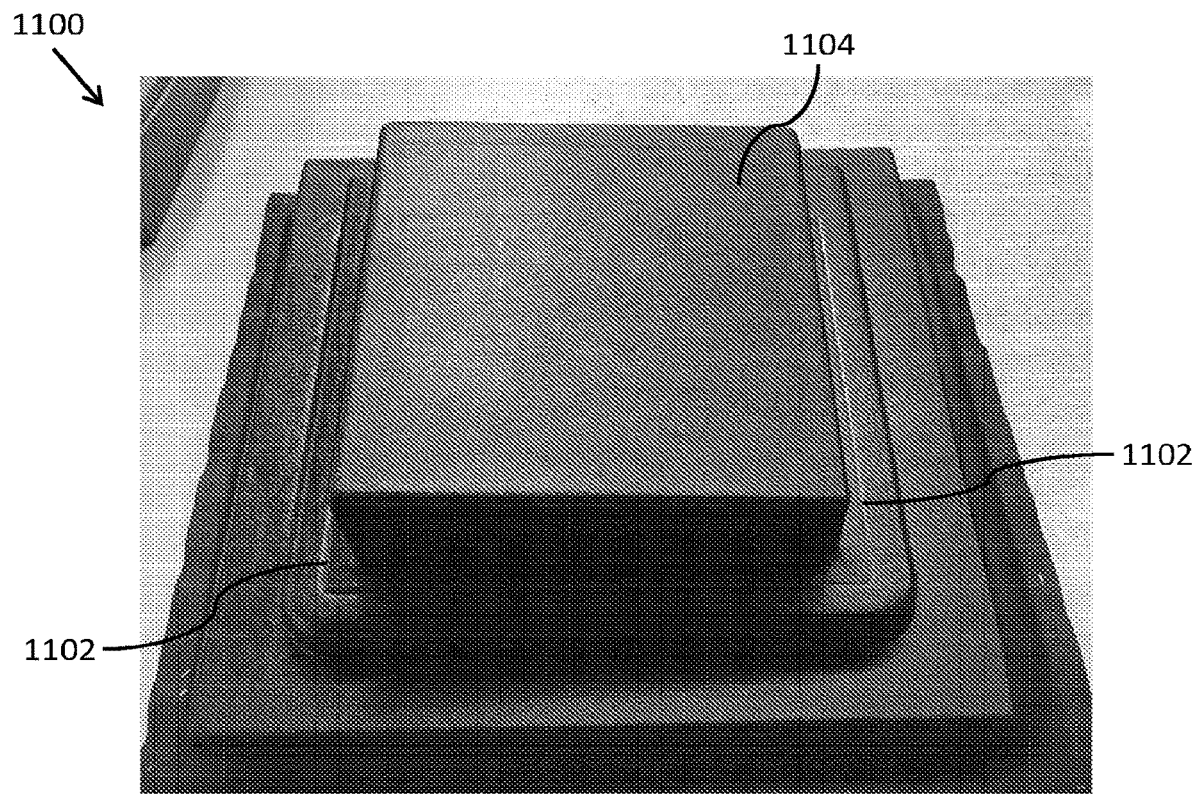
FIG. 11 is a view of another additive manufactured part configured as a vacuum mold tool.

In the example of FIG. 11, an additive manufactured vacuum mold tool 1100 is provided with trim lines 1102 at the forming surface 1104. The trim lines 1102 traverse the outline of a molded part to be cut from a sheet of vacuum forming material that has been formed against the forming surface 1104 in the manner described above with reference to FIG. 10. Such trim lines 1102 can be defined by cutting into the forming surface 1104.

Figure 12:
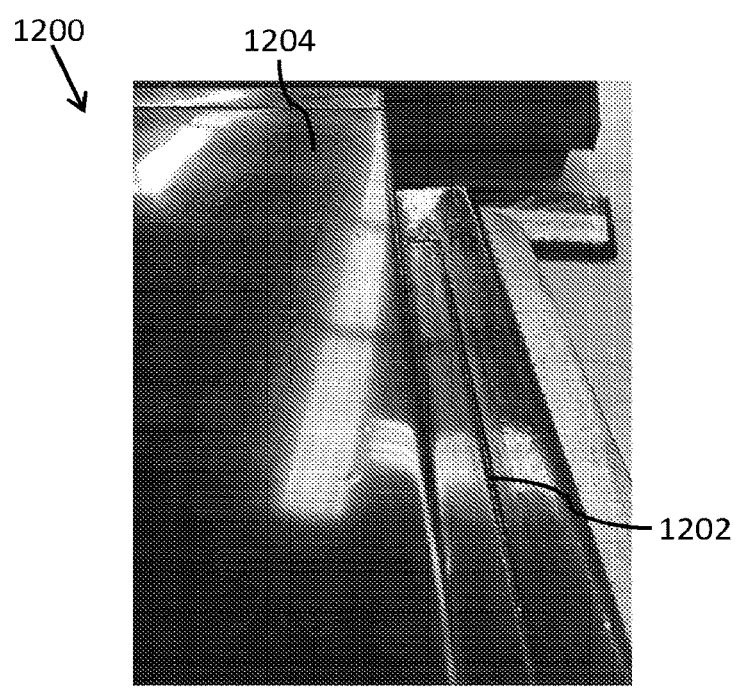
FIG. 12 is a view of another additive manufactured part configured as a vacuum mold tool.

The example of FIG. 12 also shows an additive manufactured mold tool 1200 with trim lines 1202 cut into the forming surface 1204. The tool 1200 further has additional layers of strengthening resin applied over the infused strengthening resin to provide a topcoat at the forming surface 1204. The additional layers of resin may can be applied manually and can be sanded and/or polished.

Figure 13A:
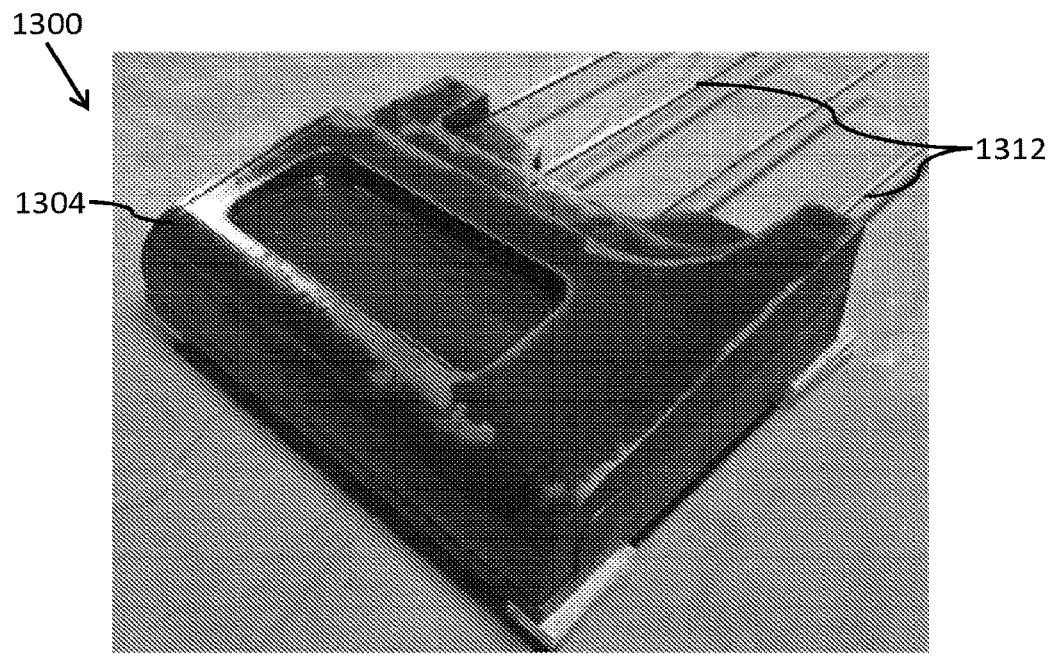
FIG. 13A illustrates a pair of additive manufactured parts configured as vacuum mold tools, also showing parts of a vacuum mold assembly.
Figure 13B:
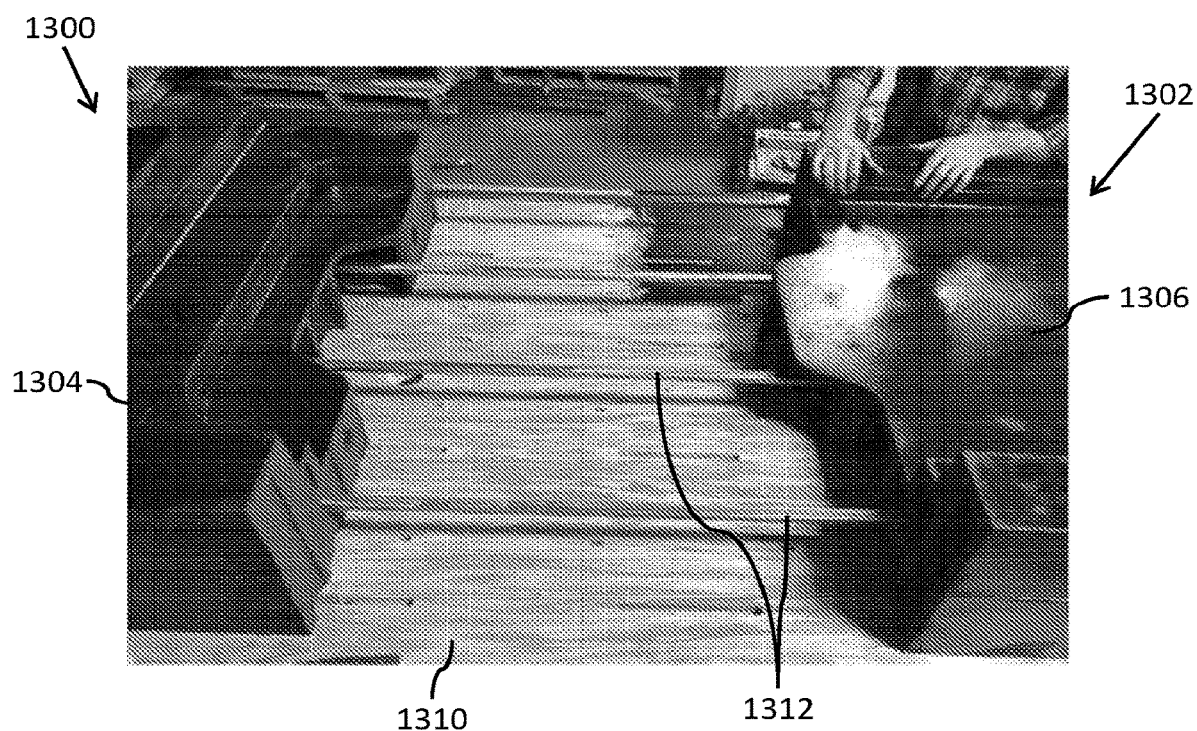
FIG. 13B illustrates a pair of additive manufactured parts configured as vacuum mold tools, also showing parts of a vacuum mold assembly.
Figure 13C:
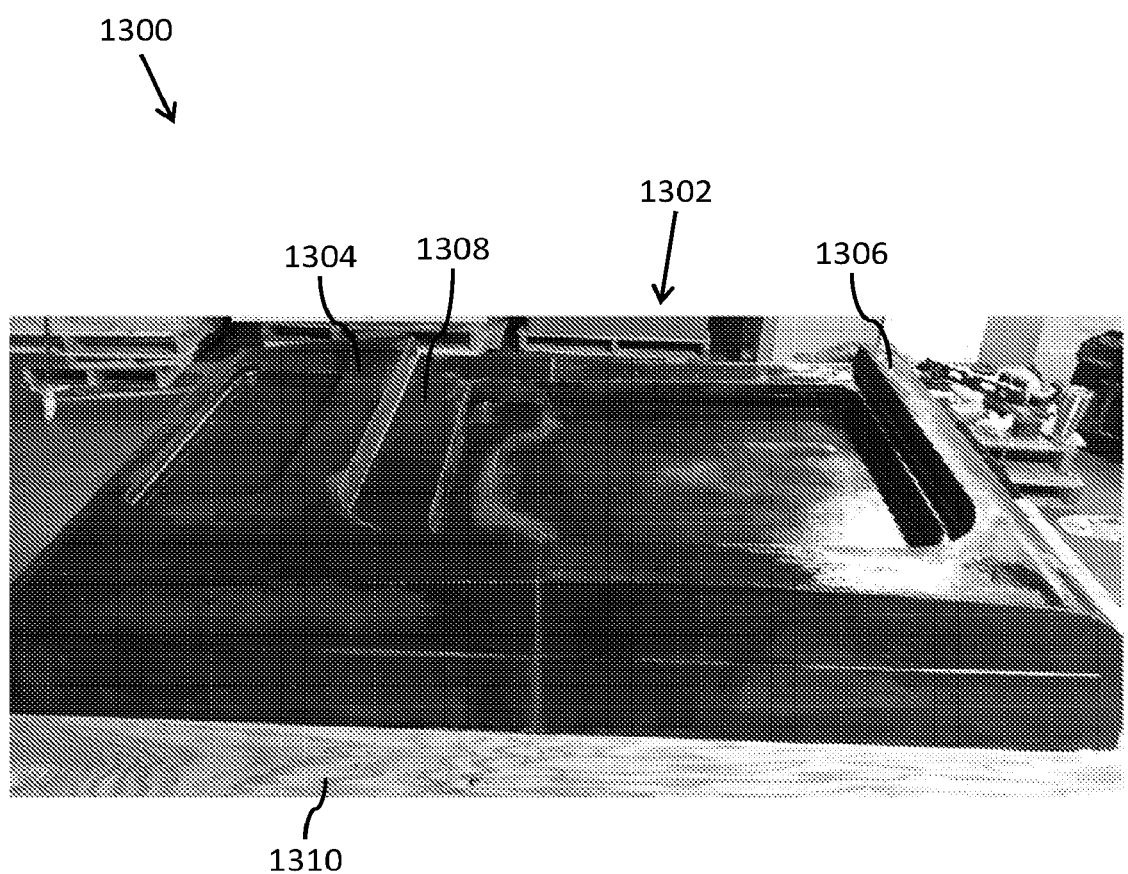
FIG. 13C illustrates a pair of additive manufactured parts configured as vacuum mold tools, also showing parts of a vacuum mold assembly.

FIGS. 13A-13C show a pair of additive manufactured vacuum mold tools 1300 and 1302 with forming surface 1304 and 1306. The forming surface 1304 and 1306 are configured to define a combined forming surface 1308 when the two mold tools 1300 and 1302 are located in adjoining positions on a base 1310, as shown in FIG. 13C. The mold tools 1300 and 1302 are moved into the adjoining positions by sliding the tools 1300 and 1302 along rails 1312 like the rails 714 described above with reference to FIG. 7.

FIGS. 14A-14F illustrate an additive manufactured part with rails for use of the part as a vacuum mold tool. The mold tool 1400 may include a forming surface 1404 configured for forming a sheet of vacuum forming material. The mold tool 1400 may include rails 1412 extending through passages 1420 extending through the tool 1400. The passages 1420 may be oriented near the bottom 1408 of the tool 1400.

The rails 1412 may be configured to support, handle, and/or index the tools 1400. For support and handling purposes, the length of the rails 1412 may be such to allow the rails 1412 to extend completely through the tool 1400 and terminate about 8 in.-10 in. (20.3 cm-25.4 cm) out one or both sides of the tool 1400. Each of the rails 1412 may be spaced apart from adjacent rails 1412 about 12 in.-24 in. (30.5 cm-61.0 cm).

Each of the rails 1412 may be made from any of a variety of materials, with any of a variety of dimensions, capable of handling and supporting the weight of the tool 1400. For example, the rails 1412 may be made from a metal material, a wood material, or the like, and may have a diameter or width of about 1 in.-2 in. (2.5 cm-5.0 cm).

Figure 14A:
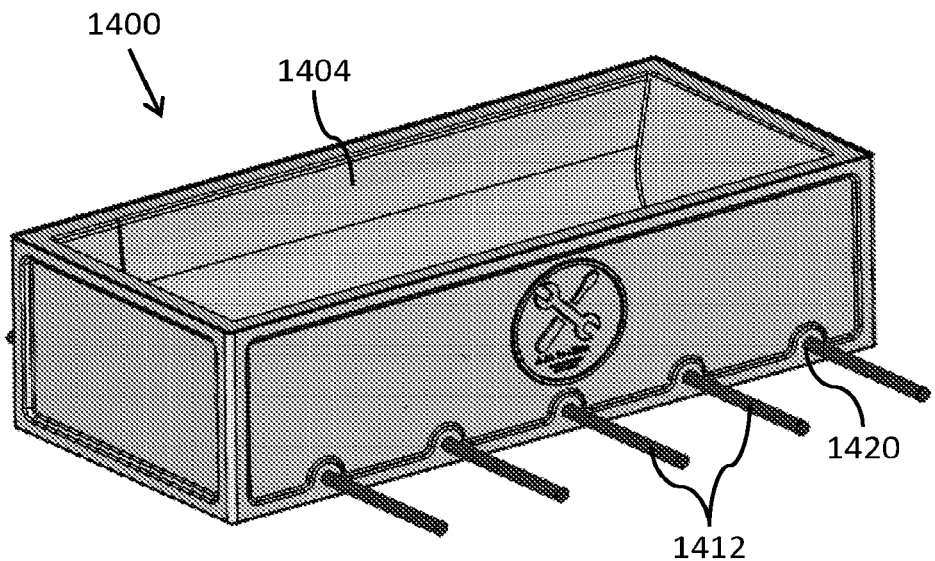
FIG. 14A is a view of an additive manufactured part with rails for use of the part as a vacuum mold tool.
Figure 14B:
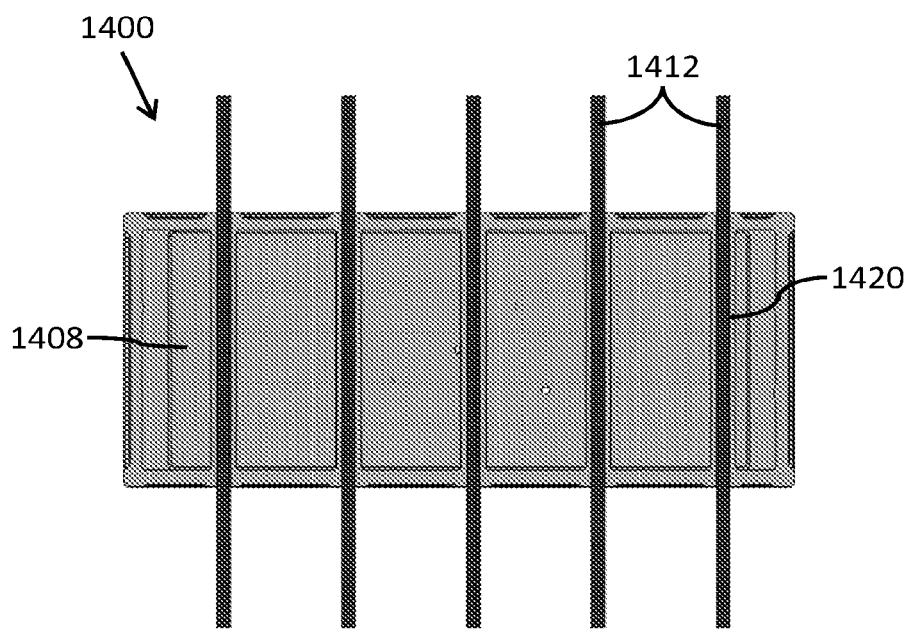
FIG. 14B is a sectional view of an additive manufactured part with rails for use of the part as a vacuum mold tool.
Figure 14C:
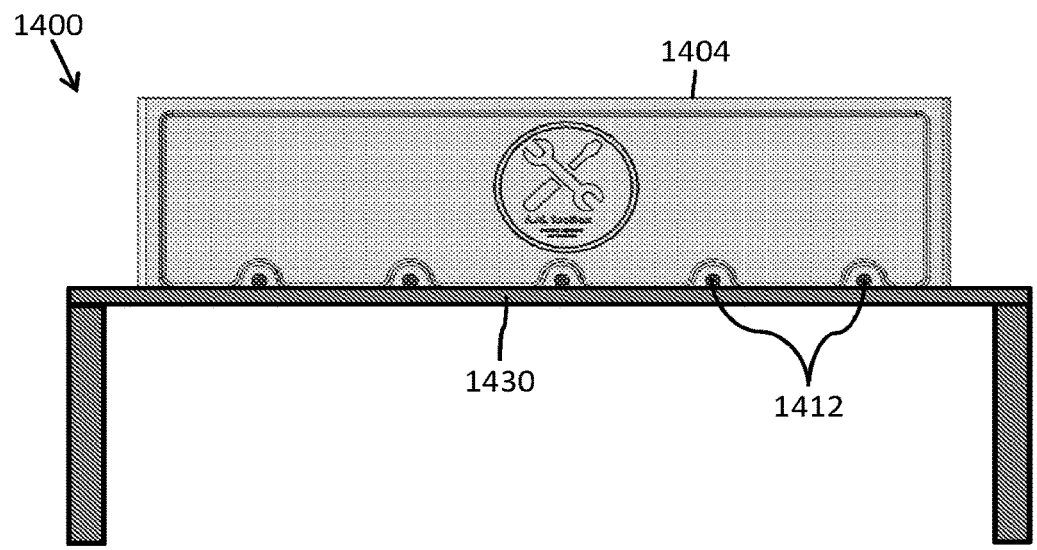
FIG. 14C is a view of an additive manufactured part with rails for use of the part as a vacuum mold tool.
Figure 14D:
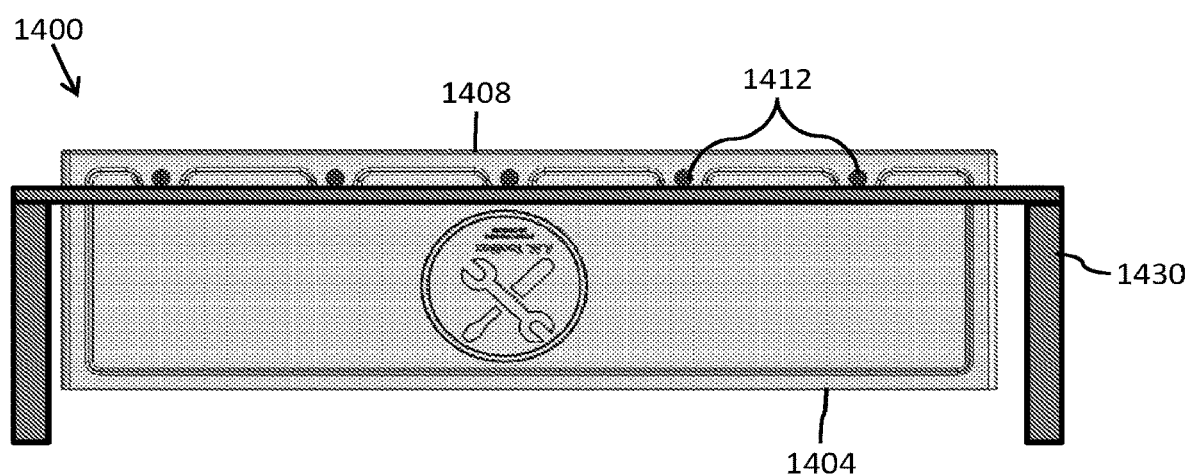
FIG. 14D is a view of an additive manufactured part with rails for use of the part as a vacuum mold tool.

As illustrated in FIGS. 14C and 14D, the rails 1412 may be used to support the tool 1400 on a support device 1430, such as an open-end table, rack, or the like. As illustrated in FIG. 14D, the tool 1400 may be inverted, using the rails 1412 to both handle and support the tool 1400. In this manner, all areas along the periphery of the tool 1400 may be accessed for processing in preparing and finishing the tool.

Figure 14E:
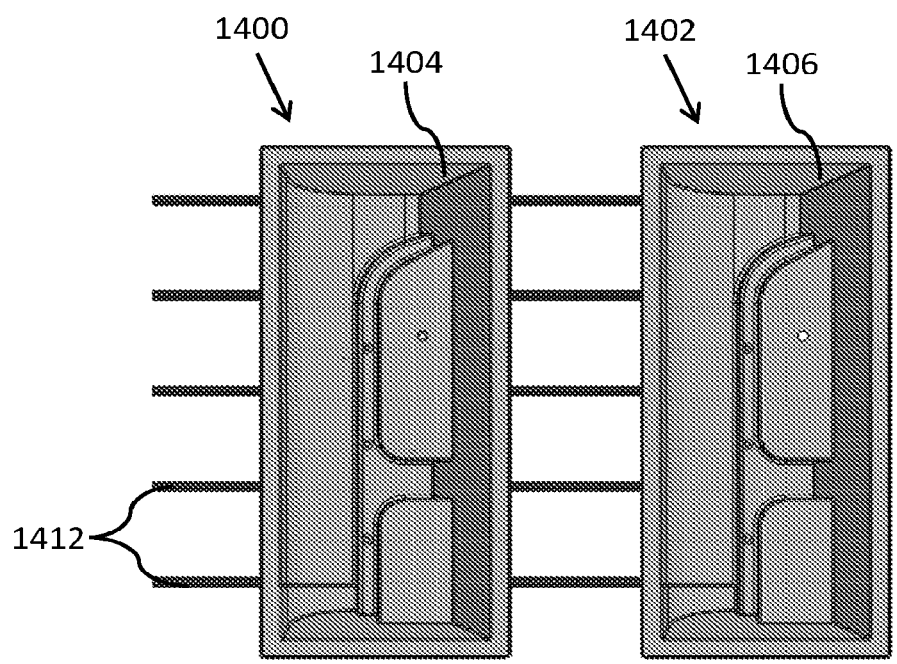
FIG. 14E is a view of a pair of additive manufactured parts with rails for use of the part as a vacuum mold tool.
Figure 14F:
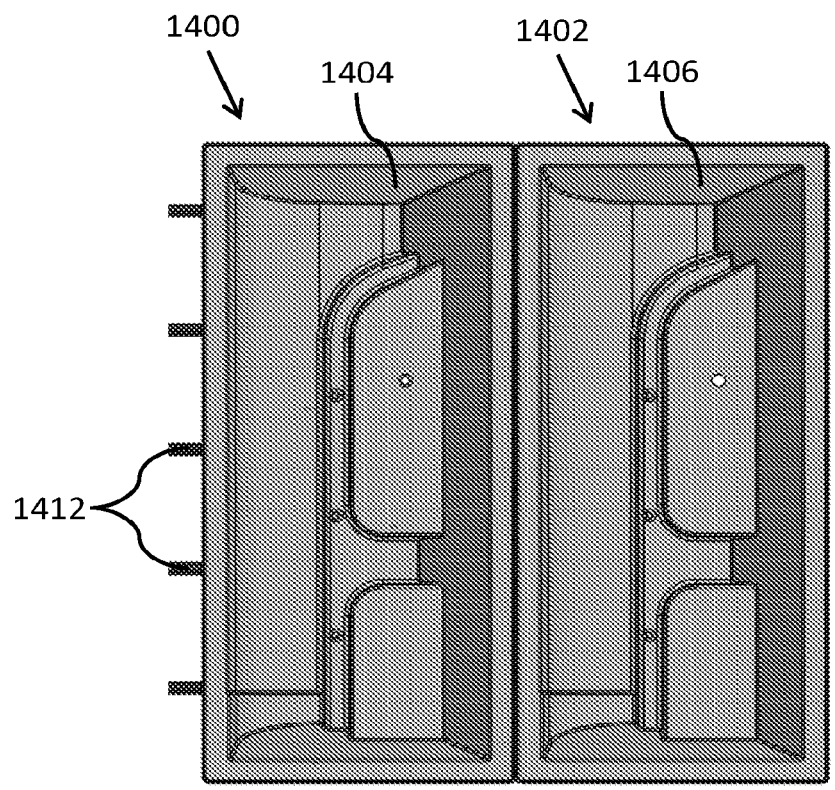
FIG. 14F is a view of a pair of additive manufactured parts with rails for use of the part as a vacuum mold tool.

As illustrated in FIGS. 14E and 14F, the rails 1412 may be used to index a plurality of tools 1400, 1402 adjacent to one another for the forming of multiple vacuum form parts at one, or to assemble multiple parts of a modular, larger tool. The first tool 1400 may have a first forming surface 1404, while the second tool 1402 may have a second forming surface 1406. Optionally, the first and second forming surfaces 1404, 1406 may be sections of a larger forming surface. The first tool 1400 and the second tool 1402 may slide along the rails 1412 into a desired orientation relative to one another.

Figure 15A:
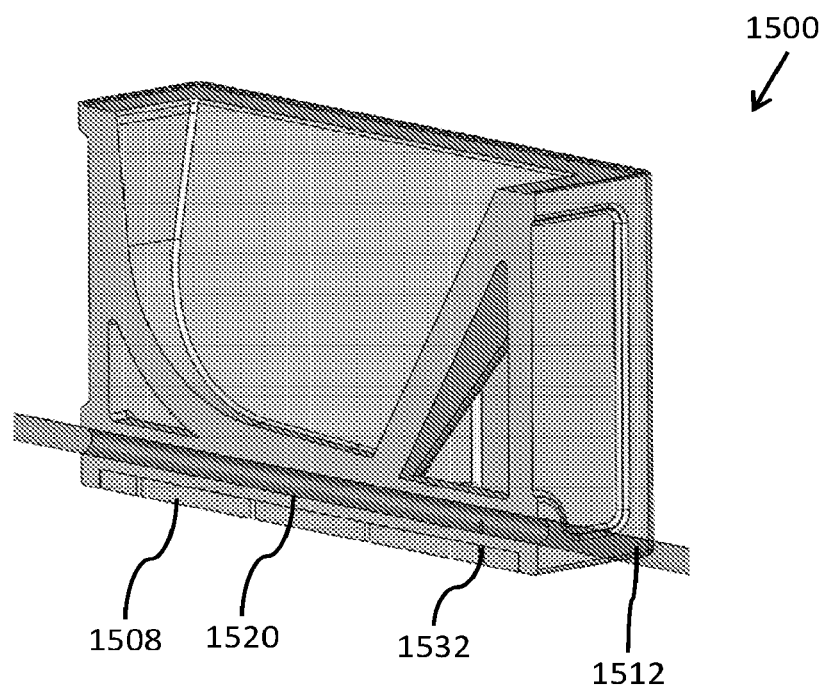
FIG. 15A is a sectional view of an additive manufactured part with a rail for use of the part as a vacuum mold tool.
Figure 15B:
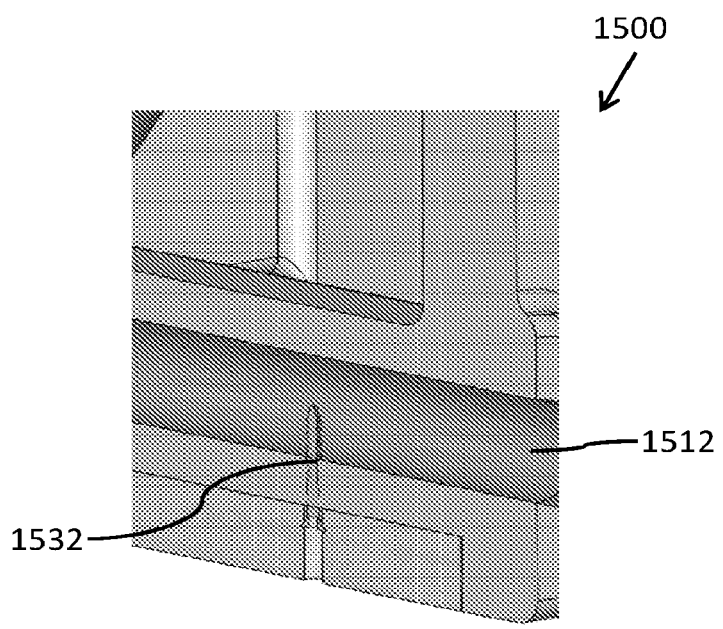
FIG. 15B is a partial sectional view of the additive manufactured part illustrated in FIG. 15A.

FIG. 15A illustrates a sectional view of a mold tool 1500 including a rail 1512 extending through a passage 1520. A fastener 1532 may extend through the bottom 1508 of the tool 1500 to secure the tool 1500 to the rail 1512. That is, the fastener 1532 may prevent the rail 1512 from sliding axially in and out of the tool 1500. The fastener 1532 may include any of a variety of fasteners, including a screw. FIG. 15B illustrates a partial sectional view of the tool 1500 illustrated in FIG. 15A, including the fastener 1532 securing the rail 1512 and the tool 1500 to one another.

Figure 16:
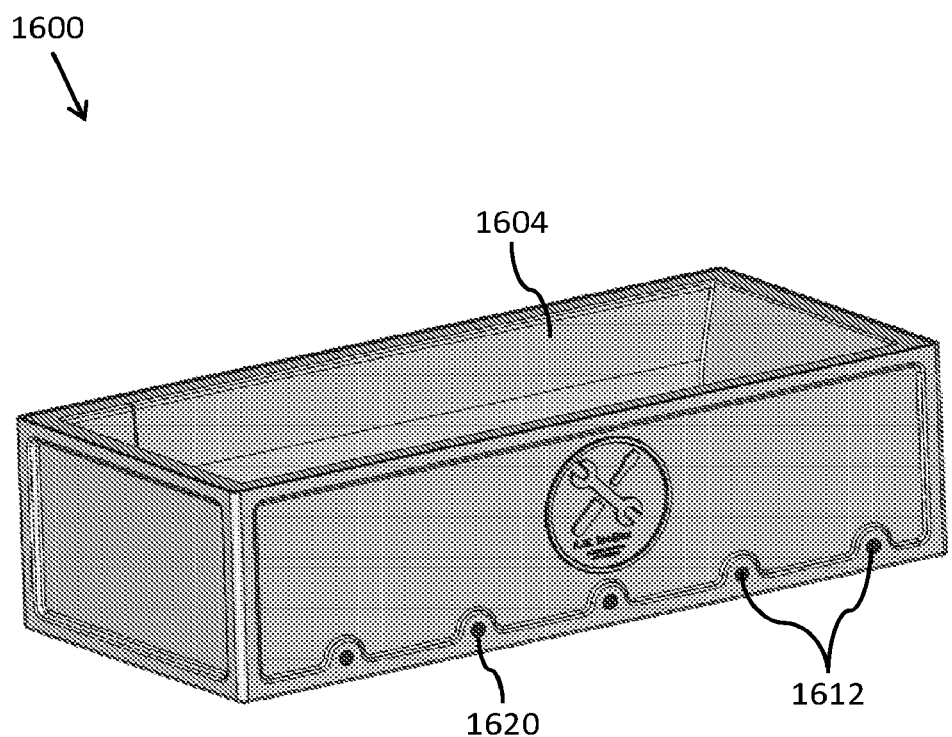
FIG. 16 is a view of an additive manufactured part with rails for use of the part as a vacuum mold tool.

FIG. 16 illustrates a mold tool 1600 including a forming surface 1604. The tool 1600 may include a plurality of rails 1612 extending through passages 1620. Once the tool 1600 no longer needs to be handled, supported, or index with other tools 1600, the rails 1612 may be trimmed approximately flush to the side of the tool 1600 to avoid getting in the way of use of the tool 1600.

Figure 17A:
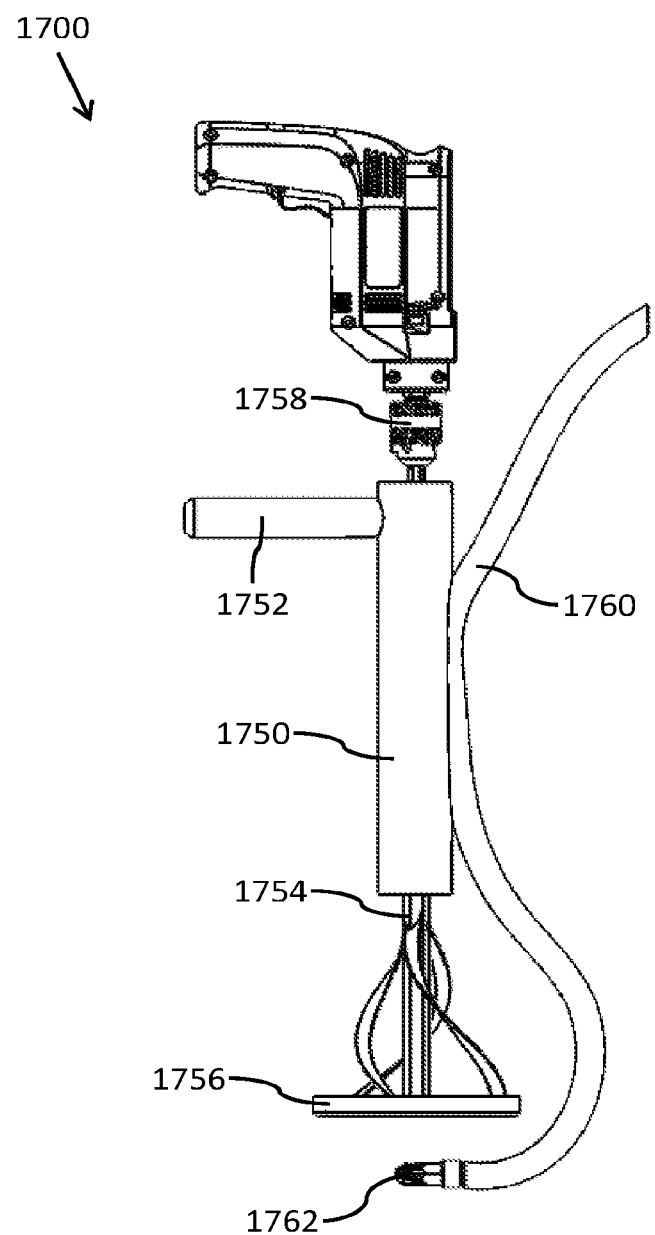
FIG. 17A is a view of tool for mixing a two-part resin and/or coating while introducing an inert gas into the mixture.
Figure 17B:
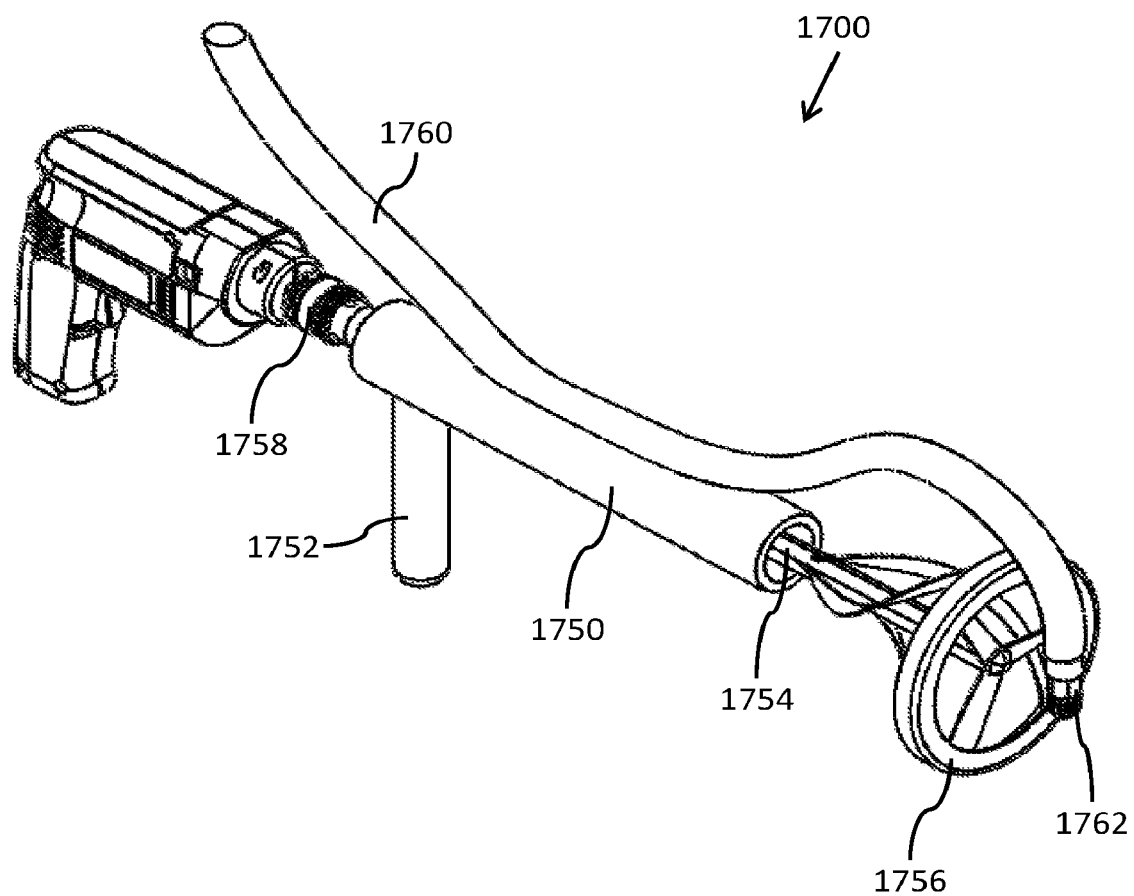
FIG. 17B is a view of tool for mixing a two-part resin and/or coating while introducing an inert gas into the mixture.
Figure 17C:
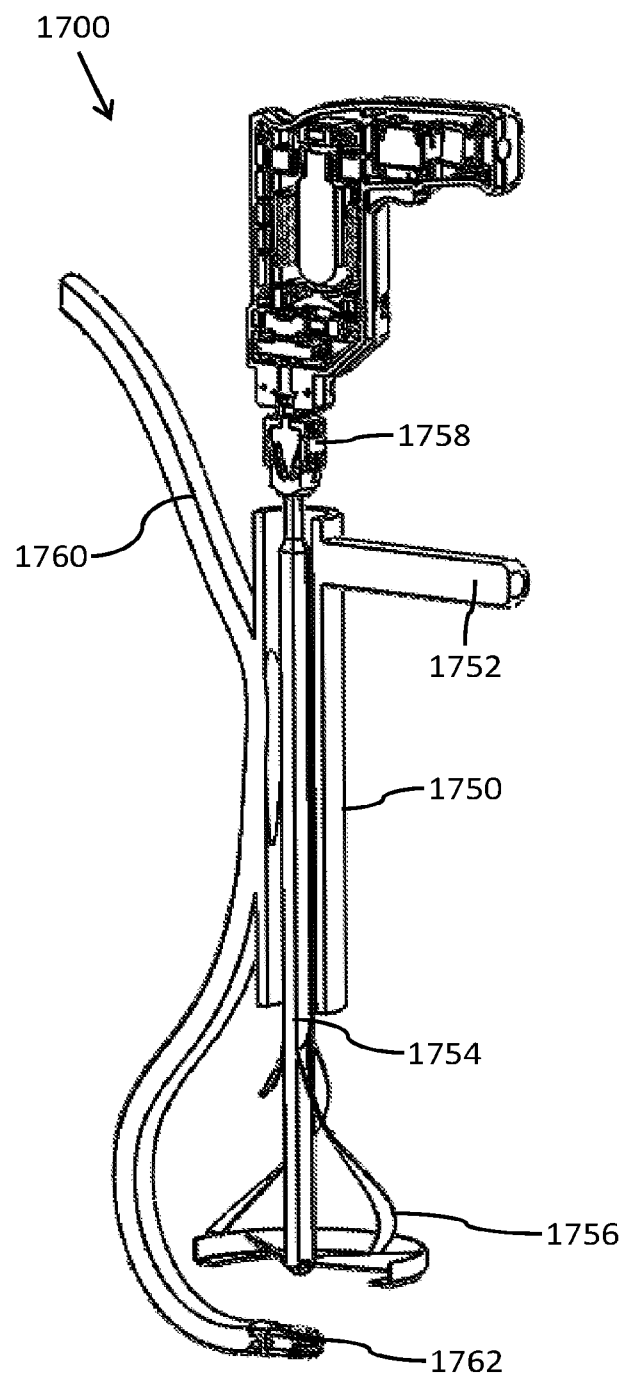
FIG. 17C is a sectional view of tool for mixing a two-part resin and/or coating while introducing an inert gas into the mixture.

FIGS. 17A-17C illustrate a mixing tool 1700 a two-part resin and/or coating while introducing an inert gas into the mixture.

Mixing tool 1700 may include a housing 1750. Housing 1750 may include a handle 1752 configured to be grasped by a user's hand for manipulation of the mixing tool 1700.

The housing 1750 may include a hollow bore, and within the hollow bore of the housing 1750 may extend a mixing shaft 1754. The mixing shaft 1754 may be rotatably attached to the housing 1750, for example, via one or more ball bearing. The mixing shaft 1754 is configured to rotate independently of the housing 1750. The distal end of the mixing shaft 1754 may include a mixing head 1756. The mixing head 1756 may be any of a variety of devices configured to mix elements, including for example, the two parts (e.g., a resin and a hardener) of a two-part resin and/or two-part coating.

The mixing tool 1700 may include a rotation-inducing device 1758. The rotation-inducing device 1758 is capable of rotating the mixing shaft 1754 and the mixing head 1756 connected to the distal end of the mixing shaft 1754. The rotation-inducing device 1758 may engage the proximate end of the mixing shaft 1754.

The mixing tool 1700 may include an air line 1760. The air line 1760 may be a flexible tube configured to introduce an inert gas to a mixture, including for example to the mixture of the two parts (e.g., a resin and a hardener) of a two-part resin and/or two-part coating. During mixing of the two parts by the mixing head 1756, a user of the mixing tool 1700 may cause an inert gas to flow through the air line 1760 and out of a nozzle 1762 attached to the distal end of the air line. The inert gas may be one or both of nitrogen and argon. The nozzle 1762 may be oriented to direct the inert gas toward the mixing head 1756, such that the inert gas is introduced directly to the site of mixing of the elements. Alternatively, the nozzle 1762 may be oriented to direct the inert gas just below the mixing head 1756, such that the inert gas is introduced below the site of the mixing and bubbles up through the site of the mixing of the elements.

The introduction of an inert gas during mixing may increase the glass transition, or Tg, of the two-part resin and/or two-part coating. The introduction of an inert gas during mixing may increase the Tg of the two-part resin and/or two-part coating by up to 30% of the manufacturer's stated Tg of the resin and/or coating. The increase of the Tg may be as a result of the introduction of the inert gas creating a mixing cyclone effect that helps to uniformly mix the two parts (e.g., a resin and a hardener) of the two-part resin and/or coating to achieve the maximum Tg potential in those materials.

The introduction of an inert gas may be included in any of the aforementioned methods of making a mold tool, including for example methods 100, 200, 300. In practice, a part formed from a powder (such as sand) and binder mixture is infused with a resin, which penetrates into the surface of the part. The resin may be a two-part resin that is mixed while an inert gas is applied to the resin as described above. Once mixed, the resin is applied to the sand and binder part on a first side (e.g., top) of the part. The resin is allowed to cure for a period of time (e.g., 24 hours), after which the part may be inverted and resin may be applied to the sand and binder part on a second side (e.g., bottom) of the part. The resin is allowed to cure for a period of time (e.g., 24 hours). At this point, the part is approximately as hard as cement.

A surface treatment, such as a two-part coating, may be applied to the part following application and curing of the resin. The two-part coating may be a tooling gel coating. The two-part coating may be mixed while an inert gas is introduced to the mixture as described above. The coating may be applied to the part (where the part is a mold tool, the coating may be applied to the forming surface). The coating is allowed to cure for a period of time (e.g., 24 hours), and the process is complete. Optionally, one may apply a fine particle, such as sand blasting material, to the coating after it is applied but before it is cured. The addition of the fine particle adds a texture to the final tool surface.

Figure 18:
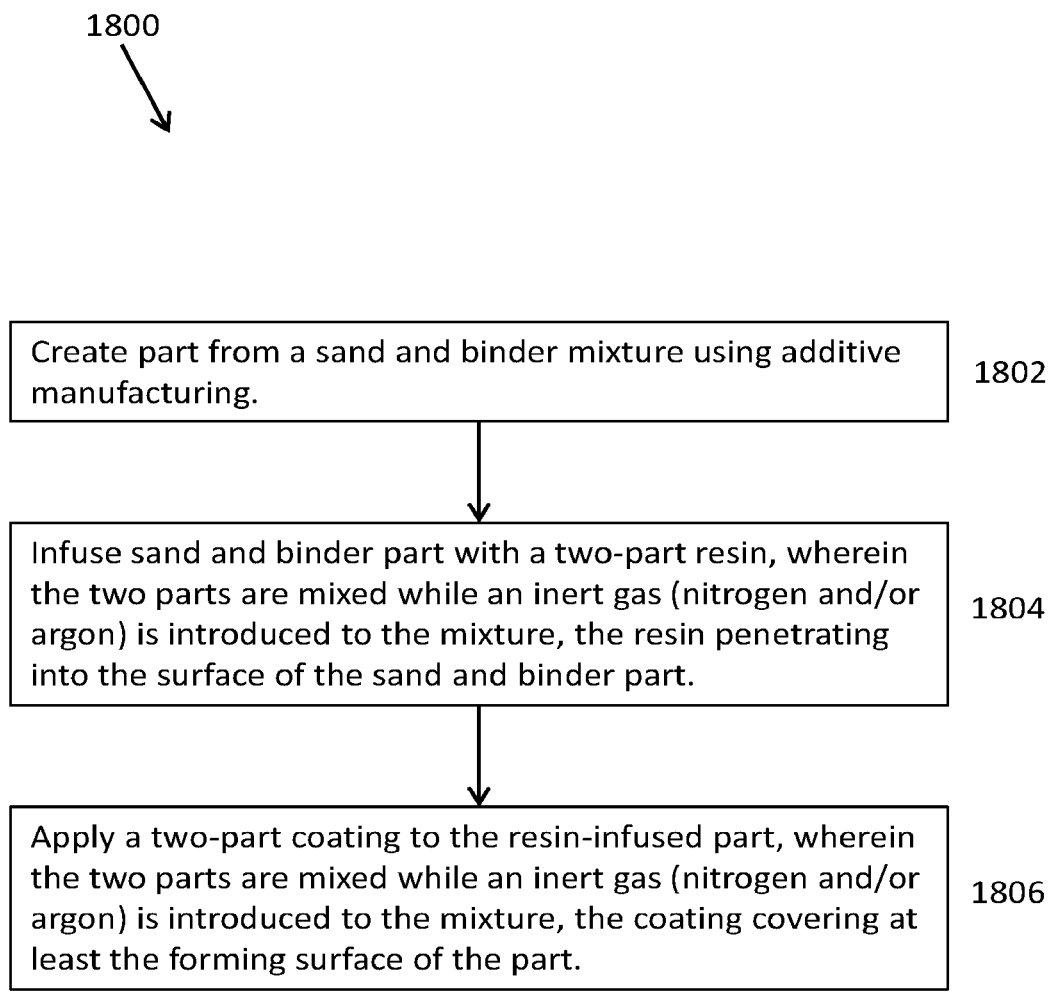
FIG. 18 is a flow chart of steps taken in a method of forming an additive manufactured part.

FIG. 18 is a flow chart of steps taken in a method 1800 of forming an additive manufactured part. Method 1800 may include the following steps: create part from a sand and binder mixture using additive manufacturing (1802); infuse sand and binder part with a two-part resin, wherein the two parts are mixed while an inert gas (nitrogen and/or argon) is introduced to the mixture, the resin penetrating into the surface of the sand and binder part (1804); and apply a two-part coating to the resin-infused part, wherein the two parts are mixed while an inert gas (nitrogen and/or argon) is introduced to the mixture, the coating covering at least the forming surface of the part (1806).

Figure 19:
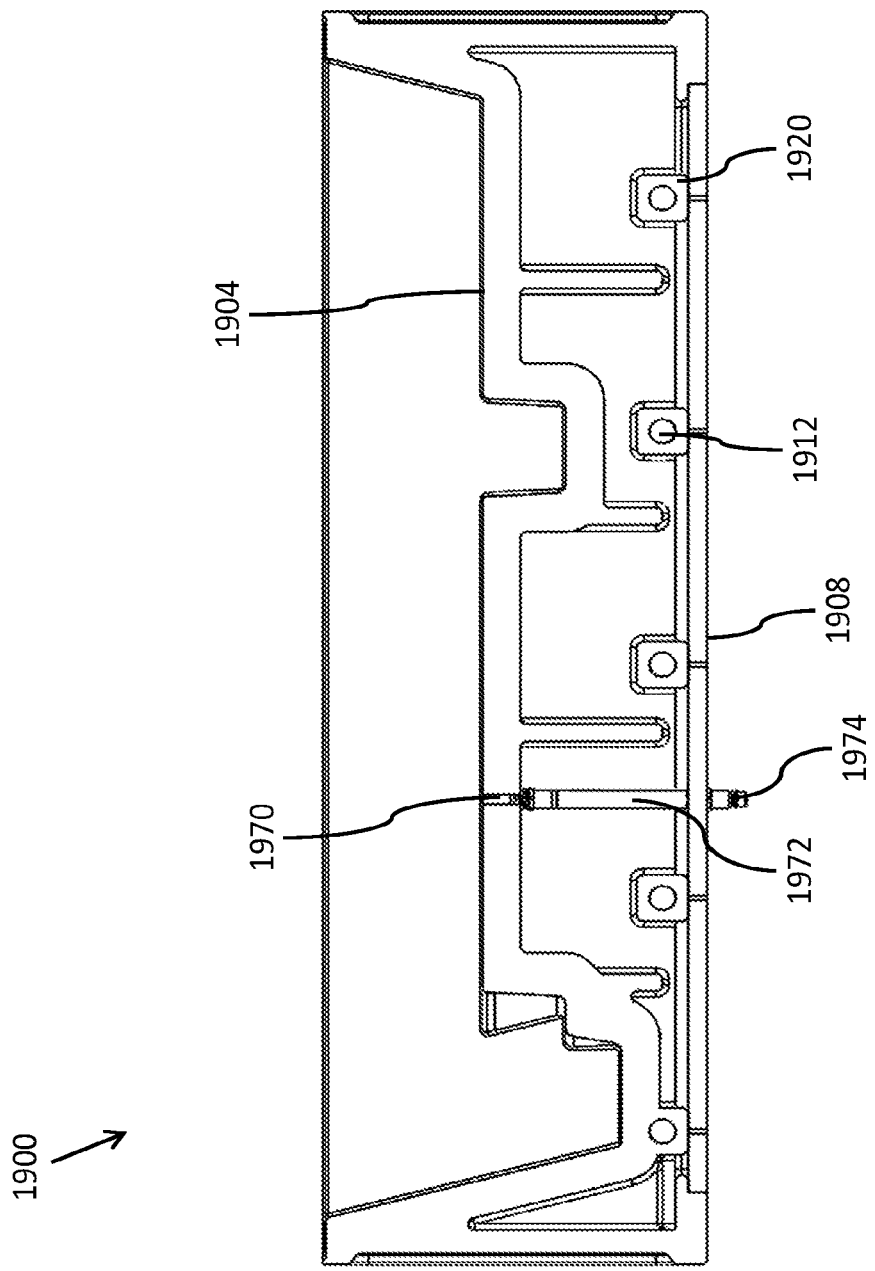
FIG. 19 is a side sectional view showing a vacuum mold tool with a pneumatic ejector element.

FIG. 19 is a side sectional view showing a vacuum mold tool 1900 with a pneumatic ejector element 1970. The mold tool 1900 may include a forming surface 1904 and a plurality of rails 1912 extending through passages 1920.

The ejector element 1970 may extend through the forming surface 1904. That is, the forming surface 1904 may include an aperture through which the ejector element 1970 may extend. As illustrated in FIG. 19, the ejector element 1970 may be approximately flush with the forming surface 1904 surrounding it while the ejector element 1970 is in its retracted position. An air line 1972 may extend from the underside of the ejector element 1970. The air line 1972 may be fluidically connected to and extend from the ejector element 1970 at the forming surface 1904, to the bottom 1908 of the tool 1900. The air line 1972 may be configured to supply pressurized air to the ejector element 1970. The air line 1972 may include an air fitting 1974 extending from or near the bottom 1908 and configured to attach a pressurized air source such as another air line extending from an air compressor. The operation of the ejector element 1970 is described further below in reference to FIGS. 21A and 21B.

Figure 20A:
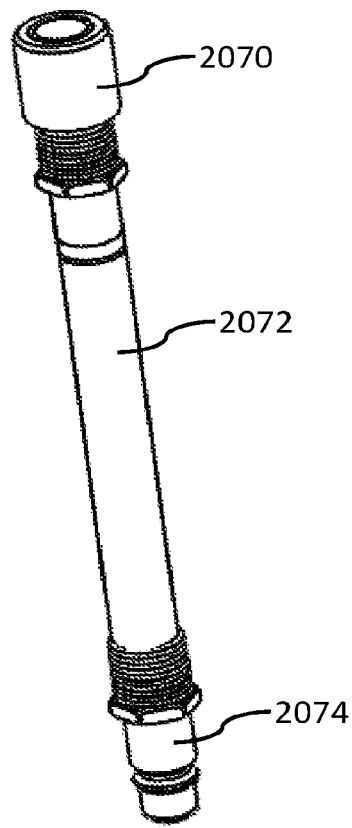
FIG. 20A is a view of a pneumatic ejector element.

FIG. 20A illustrates a pneumatic ejector element 2070, connected to an air line 2072, which in turn is connected to an air fitting 2074. This arrangement is substantially similar to that illustrated in FIG. 19, and may be arranged within a mold tool such that the ejector element 2070 extends approximately flush with a forming surface, the air fitting 2074 extends to an outer side/surface of the tool (e.g., the bottom of the tool), and the air line 2072 extends between the air fitting 2074 and the ejector element 2070. In practice, pressurized air (e.g., from an air compressor) may be selectively supplied to the air fitting 2074, causing it to flow through the air line 2072, and into the pneumatic ejector element 2070.

Figure 20B:
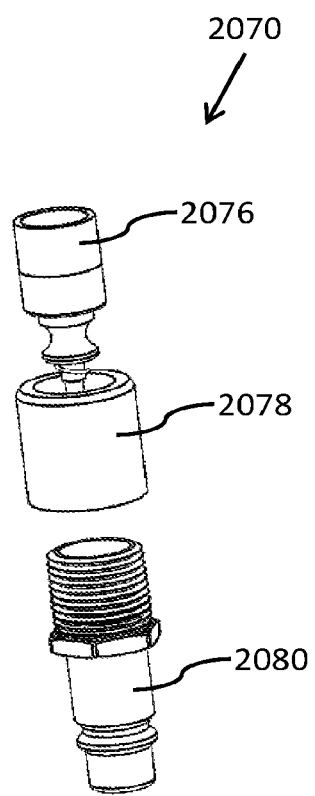
FIG. 20B is a view of a pneumatic ejector element.

FIG. 20B illustrates an exploded view of the pneumatic ejector element 2070. The ejector element 2070 may comprise a poppet 2076, a bushing 2078, and an air fitting 2080. The air fitting 2080 may be configured to engage the air line 2072, or alternatively where the mold tool has a thickness that is small enough to avoid the need of the air line 2072 altogether, the air fitting 2080 may connect directly to a pressurized air source.

The bushing 2078 may be substantially cylindrical in shape, with an outer diameter configured to fit within an aperture in the mold tool that is formed at the forming surface. The poppet 2076 may be sized and shaped to fit within the bushing 2078 and may include a biasing element (not shown) to maintain the poppet 2076 in a position within the bushing 2078. The operation of the ejector element 2070 is further described below.

Figure 21A:
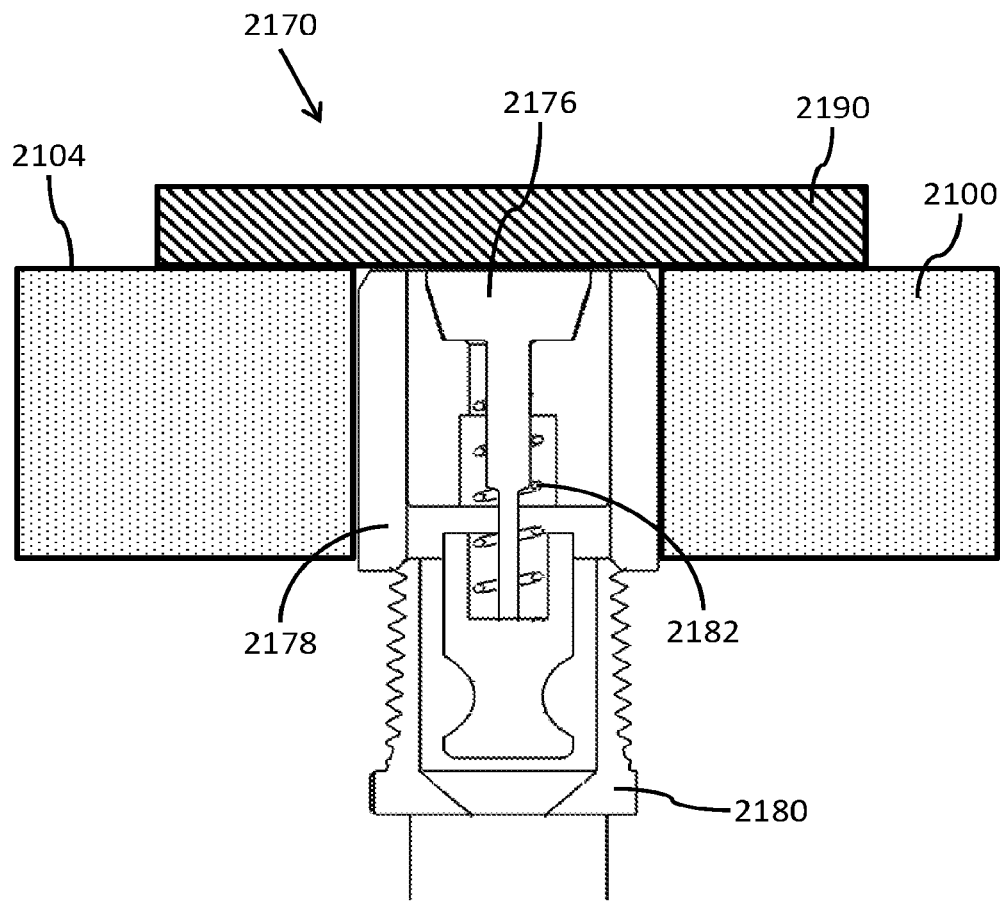
FIG. 21A is a sectional view of a pneumatic ejector element in a retraced position.

FIG. 21A illustrates the ejector element 2170 used in situ in a mold tool 2100. The tool 2100 includes a forming surface 2104. Within an aperture opening into the forming surface 2104, the ejector element 2170 is oriented such that its upper surface is approximately flush with the forming surface 2104 when the ejector element 2170 is in a retracted position. A vacuum formed material 2190 is oriented within the tool 2100 in contact with the forming surface 2104.

The ejector element 2170 may include a poppet 2176, a bushing 2178, and an air fitting 2180. The vacuum formed material 2190 may be oriented within the tool 2100 so as to contact at least one of the poppet 2176 (in its retracted position) and/or the bushing 2178. The bushing 2178 may fit within the aperture opening into the forming surface 2104. The ejector element 2170 may include a biasing device 2182 biasing the poppet 2176 into a retracted position (the retracted position being down and into the ejector element 2170). The biasing device 2182 may be any biasing device, and for example, may be a coil spring.

Figure 21B:
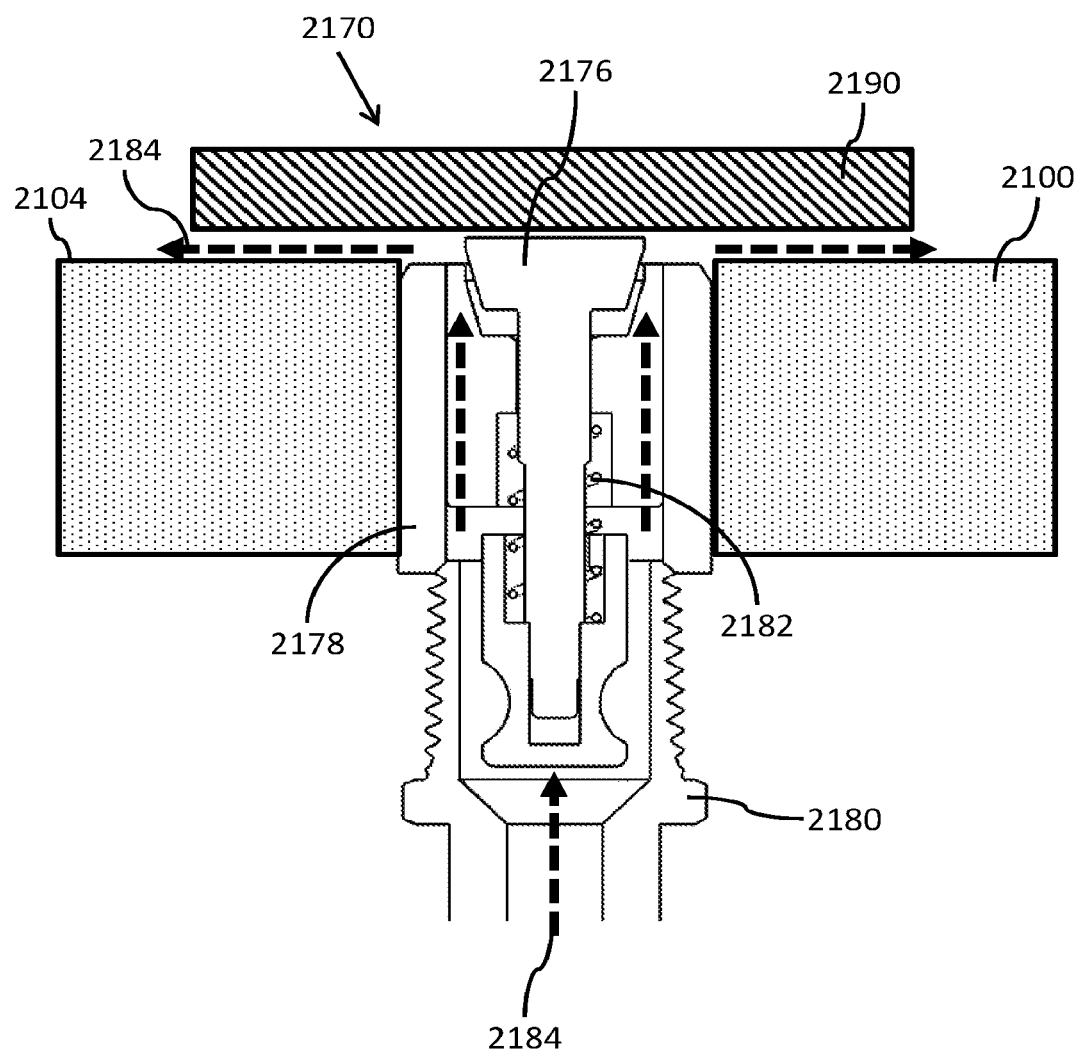
FIG. 21B is a sectional view of a pneumatic ejector element in an extended position.

The ejector element 2170 illustrated in FIG. 21A is in an "off" and retracted position. This retracted position is the default position of the ejector element 2170 when no pressurized air is applied through the air fitting 2180. FIG. 21B illustrates the ejector element 2170 in an "on" and extended position, wherein the poppet 2176 is in an extended position (the extended position being up and away from the rest of the ejector element 2170.

In practice, the ejector element 2170 is in an "off" position during vacuum forming of the vacuum formed material 2190. Due to the importance of the ejector element 2170 not leaking during the vacuum process, the poppet 2176 and the bushing 2178 may form an air-tight seal against air pressure at the forming surface 2104 when the poppet 2176 is in a retracted position. Upon completion of the vacuum forming process, wherein the vacuum formed material 2190 is ready for removal from the tool 2100, the ejector element 2170 is moved to an "on" position to assist in breaking any adhesive forces between the vacuum formed material 2190 and the forming surface 2104.

When the ejector element 2170 receives a supply of pressurized air 2184 at an adequate pressure and flow rate, the poppet 2176 overcomes the biasing device 2182 to move into an extended position. In the extended position, the poppet 2176 engages the vacuum formed material 2190 and pushes the vacuum formed material 2190 away from the forming surface 2104. In addition to the physical ramming force supplied to the vacuum formed material 2190 by the poppet 2176, the pressurized air 2184 may flow through the ejector element 2170 and between the vacuum formed material 2190 and the forming surface 2104. This flow of the pressurized air 2184 may act to further separate and disengage the vacuum formed material 2190 from the forming surface 2104, thus easing the removal of the vacuum formed material 2190 from the tool 2100. The pressure and volume flow rate of the pressurized air 2184 may be adjusted depending upon the size, shape complexity, and adhesive forces with the forming surface 2104 of the vacuum formed material 2190, so as to effect the removal of the vacuum formed material 2190 without damaging the vacuum formed material 2190.

While only a single ejector element is illustrated within the mold tool, it is contemplated that a plurality of ejector elements may be applied to any giving tool to assist in the removal of vacuum formed materials from the tool.

While the various examples above recited the use of a pressurized air for use with the ejector element, it is contemplated that a pressurized fluid of any variety may be used instead of or in addition to, air.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of aspects thereof, and while the aspects have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. A method comprising:
   forming a porous body of additive manufacturing powder and binder material in an additive manufacturing process;
   infusing a resin into the porous body,
      wherein the resin is a two-part resin including a resin and a hardener, and
      wherein an inert gas is applied to the two-part resin during mixture of the resin and the hardener;
   curing the infused resin within the porous body;
   wherein the porous body is formed with a peripheral surface and wherein the infused resin is infused inwardly from the peripheral surface;
   wherein the porous body is formed in the configuration of a tool, and wherein the tool is a vacuum mold tool having a forming surface and air flow channels communicating with the forming surface;
   forming trim lines on the forming surface of the mold tool; and
   wherein the trim lines are formed by cutting the trim lines into the forming surface.

2. The method of claim 1, wherein the porous body is formed with a thickness between opposed portions of the peripheral surface, and the infused resin is infused partially through the thickness.

3. The method of claim 1, wherein the porous body is formed with a thickness between opposed portions of the peripheral surface, and the infused resin is infused fully through the thickness.

4. A method comprising:
   placing a mold tool on a base having air flow channels, the mold tool having a forming surface and air flow channels communicating the forming surface with the air flow channels in the base;
   wherein the mold tool comprises additive manufacturing powder and a binder supporting the additive manufacturing powder as a solid body having the forming surface, and further comprising a resin infused within the solid body,
      wherein the resin is a two-part resin including a resin and a hardener, and
      wherein an inert gas is applied to the two-part resin during mixture of the resin and the hardener;
   placing a sheet of vacuum molding material over the forming surface; and
   applying vacuum pressure in the air flow channels in the base and the mold tool to draw the sheet of molding material against the forming surface;
   wherein the mold tool is one of multiple mold tools that together have multiple forming surfaces, and further comprising the step of shifting the multiple mold tools across the base relative to each other to join the forming surfaces into a combined forming surface; and
   wherein the multiple mold tools are shifted across the base relative to each other by sliding one or more of the multiple mold tools along rails reaching over the base.

5. The method of claim 4, wherein the additive manufacturing powder comprises sand.

\* \* \* \* \*